United States Patent [19]

Loy et al.

[11] 4,341,014

[45] Jul. 27, 1982

[54] METHOD AND APPARATUS FOR INTERCONNECTING PAIRS OF TERMINALS WITH A PRETWISTED PAIR OF INSULATED WIRES

[75] Inventors: Fred W. Loy, Whitehall; Robert B. Senior, Grand Haven, both of Mich.

[73] Assignee: Cooper Industries, Inc., Houston, Tex.

[21] Appl. No.: 147,370

[22] Filed: May 7, 1980

[51] Int. Cl.[3] ........................ H01R 43/00; B23P 19/00

[52] U.S. Cl. ........................................ 29/857; 29/748; 29/33 F; 29/739; 81/9.51

[58] Field of Search ....................... 29/566.4, 749, 865, 29/866, 867, 857, 748, 753, 739, 33 F; 140/140, 71; 81/9.51

[56] References Cited

U.S. PATENT DOCUMENTS

| | | | |
|---|---|---|---|
| 3,103,735 | 9/1963 | Bos et al. | 29/564.4 X |
| 3,185,183 | 5/1965 | Loy | 140/71 |
| 3,523,353 | 8/1970 | Drinkard et al. | 29/753 X |
| 3,553,813 | 1/1971 | Brown, Jr. et al. | |
| 3,779,290 | 12/1973 | Rich et al. | 81/9.51 X |
| 3,803,696 | 4/1974 | Harms et al. | |
| 3,853,156 | 12/1974 | Folkenroth et al. | 81/9.51 X |
| 3,879,832 | 4/1975 | Fidiam | |
| 3,884,276 | 5/1975 | Poplaski | 140/115 |
| 3,960,309 | 6/1976 | Hazel | |
| 4,089,452 | 5/1978 | Houser | |
| 4,099,428 | 7/1978 | Senior et al. | |
| 4,117,585 | 10/1978 | Smith | 140/140 X |
| 4,126,935 | 11/1978 | Rhines et al. | 29/749 X |

*Primary Examiner*—Francis S. Husar
*Assistant Examiner*—Carl J. Arbes
*Attorney, Agent, or Firm*—David D. Murray

[57] ABSTRACT

A method and apparatus for interconnecting pairs of terminals with a pretwisted pair of insulated wires routes, cuts, strips, identifies, and secures such identified ends of the pretwisted wire pair to appropriate terminals. Routing operations are performed in part by pairs of biaxially translatable dressing finger assemblies which engage the twisted pair and provide points about which the wire is routed to achieve complex wiring patterns having multiple bends. Routing and terminating operations are performed by a pair of substantially identical mechanisms which are also mounted for biaxial translation. Such mechanisms include assemblies which prepare the ends of the twisted pair for termination by severing the wire, untwisting a portion of the wire adjacent its ends, and removing insulation from a portion of the untwisted wires, as well as assemblies which achieve proper terminal interconnection by identifying the individual wires at each end, directing and loading the wires into appropriate wrapping tools, and securing the wires about appropriate terminals in multiple helical wraps.

44 Claims, 35 Drawing Figures

FIG. 15
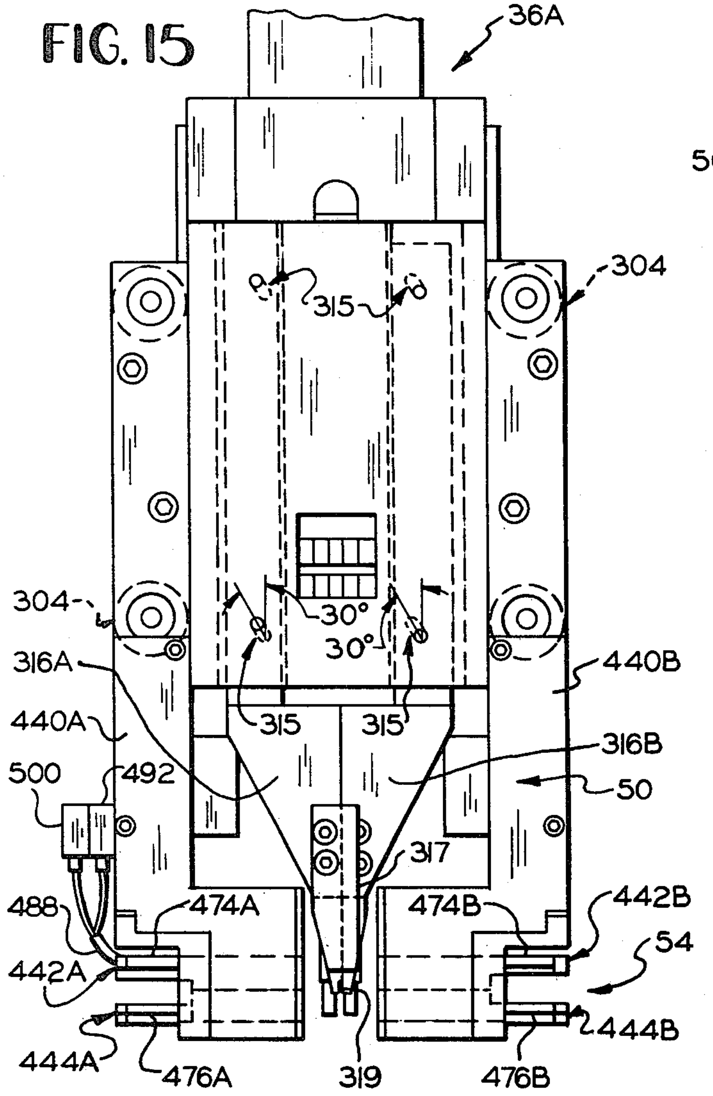
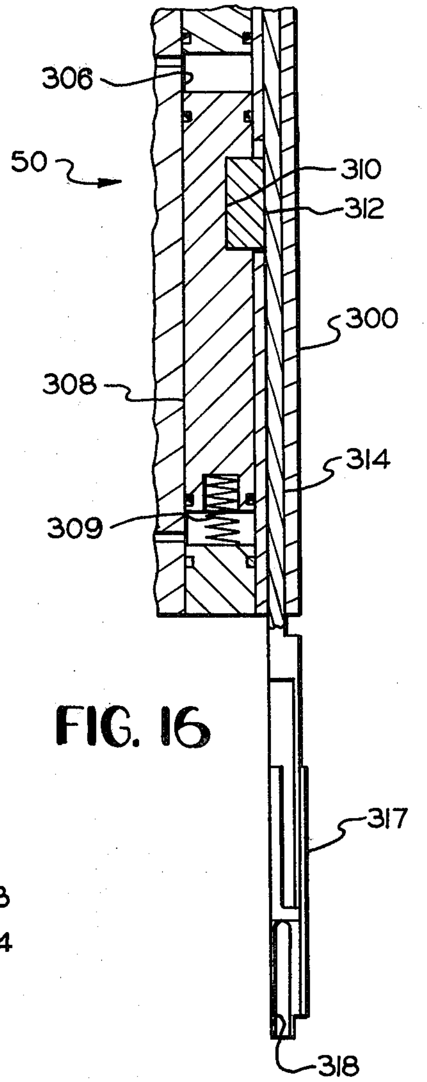
FIG. 16
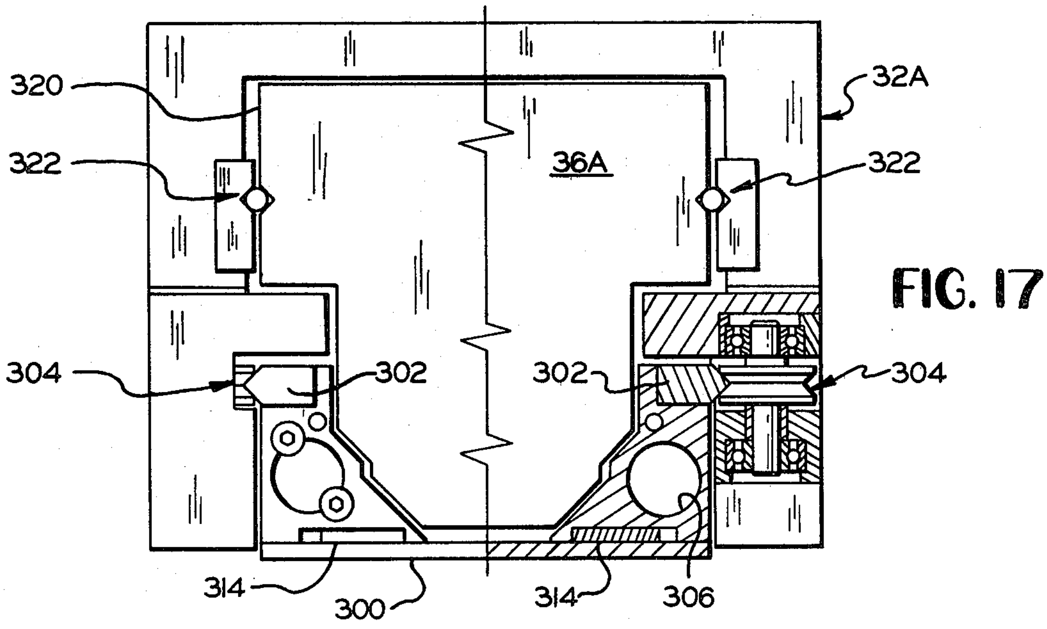
FIG. 17

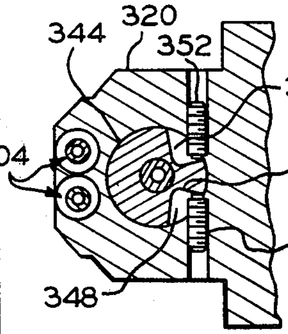
FIG. 19
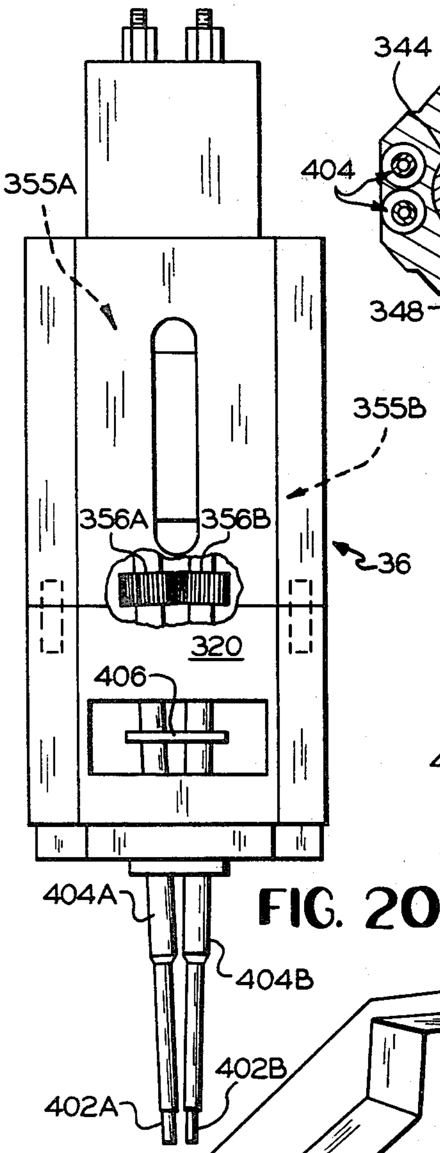
FIG. 20
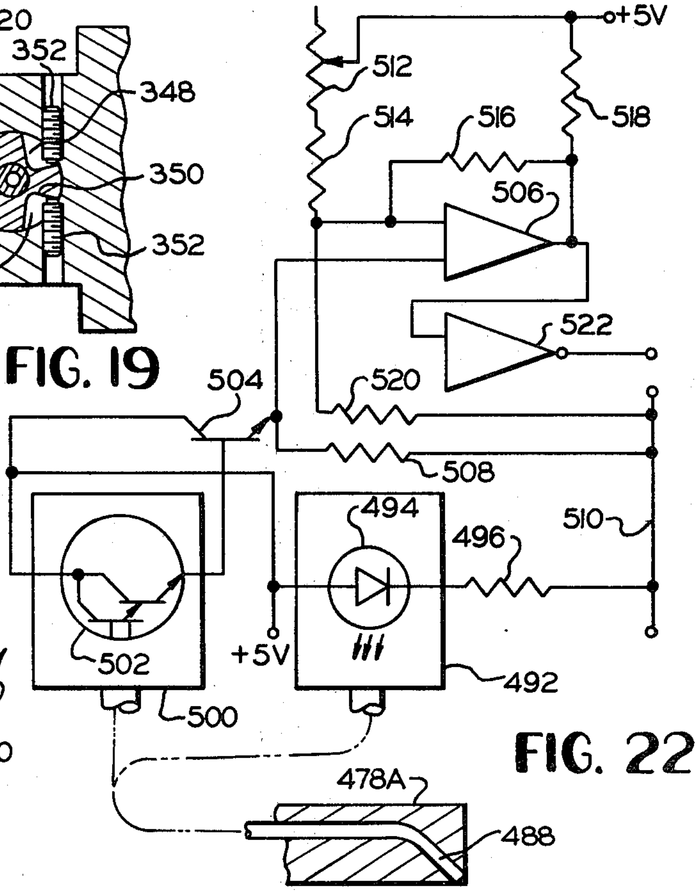
FIG. 22
FIG. 21
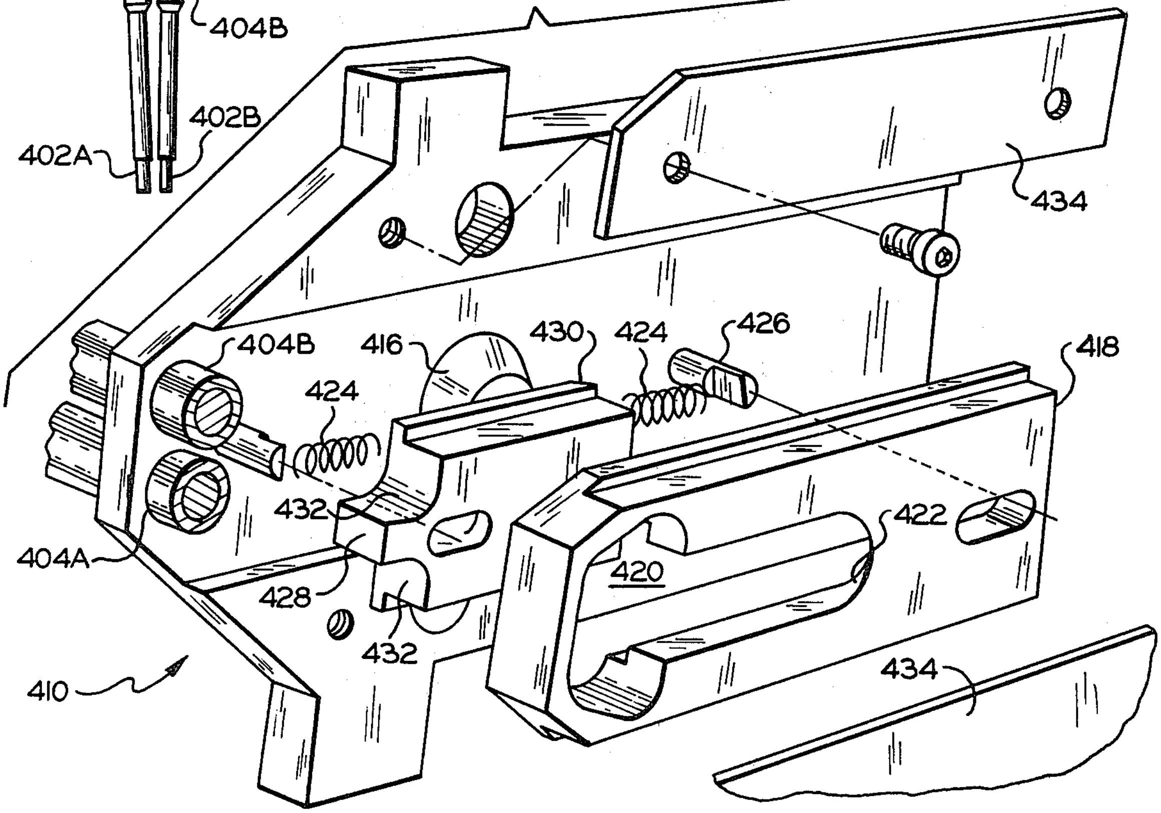

54
478A
478B
480A
480B
402A
402B
316A
316B
50
36
20

METHOD AND APPARATUS FOR INTERCONNECTING PAIRS OF TERMINALS WITH A PRETWISTED PAIR OF INSULATED WIRES

BACKGROUND OF THE INVENTION

The invention relates generally to machines for automatically interconnecting terminals with wire and more specifically to a method and apparatus for interconnecting pairs of terminals on large scale circuit boards with a pretwisted pair of insulated wires.

Automatic apparatus for interconnecting selected pairs of terminals disposed in a two dimensional array on a panel are well known in the art and are exemplified by the machines disclosed in U.S. Pat. No. 3,103,735 to J. R. Bos et al. and U.S. Pat. No. 3,185,183 to F. W. Loy. In these machines, a length of single conductor insulated wire is routed between two terminal pins and secured thereto by tightly wrapping uninsulated ends of the wire about the pins in a helical stack. Such machines generally include a pair of substantially identical wrap tools which are mounted on independent carriages for translation along X and Y coordinate axes such that the wrap tools may be moved into alignment with the terminal pins to which connection is to be made. The utilization of only two wiring carriages, of course, limits machine capability to straight-line, point-to-point wiring. Due to the large number of closely spaced terminals which may reside on a circuit board and the wiring density which may accumulate in certain regions of the board, it has been found desirable to route interconnecting wires in patterns other than a straight line in order to avoid and minimize high wiring density regions. Therefore, additional similarly translating dressing finger mechanisms have been incorporated to provide additional moveable points about which an interconnecting wire may be formed in order to achieve a desired wiring pattern. The number of independently controllable dressing finger mechanisms is directly related to the complexity of wiring patterns which the machine may achieve. Typically two or four such mechanisms will be utilized, providing the machine with the capability of achieving complex U and Z shaped patterns.

In spite of the sophistication, speed, and reliability which such machines exhibit, they typically have been limited to the routing and interconnection of a single conductor between two terminal pins. For many applications, however, it is desirable to utilize twisted pair conductors between terminal pins. Twisted pair wire interconnections are desirable for several reasons, the most important of which is the reduction of cross talk. Assuming the wires of a twisted pair constitute the signal and ground return path of a circuit, their electromagnetic fields will be oppositely directed and thus tend to cancel one another. Thus the resultant electromagnetic field of a twisted pair is substantially less than that of either of the individual, isolated conductors. Therefore, a twisted pair wire tends to induce less interference and cross talk in adjacent wires. Similarly, the twisted pair wire is, itself, less subject to induced interference from adjacent wires since its magnetic field is less likely to be disturbed by those of adjacent conductors.

Assuming the wire is routed and terminated in accordance with conventional single conductor wire machine practice, secondary advantages accrue. First of all, a machine will complete approximately twice the number of connections in a given time inasmuch as two wires, rather than one, will be routed and terminated during every wire installation cycle. Secondly, visual inspection is simplified inasmuch as two wires and four connections can generally be verified in slightly more time than it now takes to verify placement of one wire and two connections. Devices for interconnecting pairs of terminals with a twisted pair wire are part of the prior art, however, they suffer from one or more drawbacks which render them less than ideal for their intended purpose. For example, it has been suggested that two untwisted wires be utilized by a substantially conventional machine, which incorporates means for twisting the two wires into a twisted pair prior to termination. Those skilled in the art of wire twisting will acknowledge and appreciate the difficulty of achieving a proper bi-helical wrap of two conductors, especially when short lengths of wire are being utilized to create the twisted pair. Even a slight inequality of length will generally result in the longer wire being wrapped around, not with, the shorter wire. It has been found that unless two wires are twisted one about the other in an accurate, bi-helical fashion, the electromagnetic field generated by passage of electricity therethrough will neither be uniform nor minimal. Thus, while the prior art discloses an apparatus for interconnecting terminals with a twisted pair wire, it does not achieve the major advantage of this wiring scheme, i.e., minimum cross-talk.

Ideally, a machine capable of routing and terminating twisted pair conductors will include components for identifying each conductor of the twisted pair and connecting it to the proper one of a pair of terminals at each end such that the proper signal sense or circuit route is automatically achieved. Prior art devices either disclose identification schemes such as visual examination and responsive manual direction by an operator or wire identification means and associated components unsuitable for use in a wire connecting machine.

As noted above, one general difficulty of a discrete wire-terminal interconnecting scheme may be the buildup of wires, i.e., wire density, in certain areas of the board. Not only is such wiring buildup undesirable from an aesthetic standpoint but it renders both installation and board inspection difficult. Buildup of twisted pair wire is an even more severe problem inasmuch as the random orientation of the wrapped pair will tend to inhibit nesting of the wires and increase the overall cross-sectional area of a plurality of twisted pairs. Prior art twisted pair wiring machines do not have appropriate and sufficient mechanisms capable of achieving complex wiring patterns and minimizing wire buildup.

SUMMARY OF THE INVENTION

The present invention provides an improved method and apparatus for routing, cutting, stripping, identifying, and securing such identified ends of a uniformly pretwisted pair of wires between two pairs of a plurality of terminals arranged in an array on a circuit board. The mechanism generally comprises a pair of substantially identical wire wrapping tools disposed in tool carriages which are translatable along horizontal coordinate axes. Four auxiliary carriages which are selectively securable to the tool carriages for translation therewith include dressing fingers which assist in the routing of the wire. One of the tools includes means for receiving twisted pair wire from a supply reel and loading, i.e., advancing one end of the twisted pair wire to the other tool carriage, a tensioning device to maintain proper tension on the twisted pair wire during routing, and a device for cutting the end of the twisted pair wires subsequent to the routing operation. The other tool carriage includes means for receiving the free end of the twisted pair wire. Both of the tool carriages include a pair of gripper jaws which assist in the handling and routing of the twisted pair wire, a stripping and untwisting mechanism which straightens a portion of the twisted pair conductors and removes the insulation therefrom, a sensing device which identifies one of the twisted pair of wires and thus determines the identification of both wires, loading slides which properly direct each of the wires of the twisted pair and pairs of wrapping tools which are loaded with the identified wires and which achieve the wire to terminal connection by wrapping the wire tightly about a terminal pin.

Briefly, operation of the twisted pair wiring machine entails a regroup motion in which the two tool carriages translate into face-to-face opposition with one another and a wire feed tube is extended between the carriages to positively channel the advancing wire pair therebetween. The feed tube is then retracted, the wire is gripped by the receiving tool carriage and routing feed tension is applied to the twisted pair. Next, the routing or pattern excursion is achieved which, depending on the complexity of the pattern, utilizes one or more of the dressing fingers to form bends in the wires. At the completion of the pattern excursion the tool carriages and specifically the wrap tools are in position over the terminals to which the wires will be connected, the proper length of wire is supplied as a result of the pattern excursion, and it is severed. The ends of the twisted pair wire are untwisted, both to facilitate insulation stripping and lead identification. Stripped and identified, the four ends of the twisted pair are loaded into wrapping tool bits in accordance with the overall circuit or wiring scheme in order to mantain proper signal paths, phase sense, or continuity. The wrap tools are advanced into engagement with the selected terminal pins and the wires are simultaneously wrapped in multiple wrap helices about the pins. Finally, the wrap tools and dressing fingers are retracted, the tool carriages regrouped, and the cycle is repeated.

A wire connecting apparatus according to the present invention thus provides fully automated interconnection between two pairs of terminal pins disposed in array of terminal pins on a circuit board with a pair of pretwisted wires. The ends of the wires are identified prior to connection to one of the pair of pins and thus correct interconnection necessary to achieve proper circuit sense, for example, phase is automatically achieved.

It is thus an object of the instant invention to provide a fully automated apparatus for interconnecting pairs of terminals with a pretwisted pair of wires.

It is a further object of the instant invention to provide a method of interconnecting pairs of terminals with a pretwisted pair of wires.

It is a still further object of the instant invention to provide an apparatus which interconnects two pairs of terminals with a pair of pretwisted wires while maintaining proper circuit sense.

It is a still further object of the instant invention to provide an apparatus capable of routing wires in complex patterns on circuit boards having up to four right angle corners which minimizes wire buildup.

Further objects and advantages of the instant invention will become apparent by reference to the following specification and appended drawings.

BRIEF DESCRIPTION OF THE DRAWINGS

FIG. 15 is a front elevational view of a wrap tool carriage according to the instant invention;

FIG. 16 is a full sectional side view of the gripper jaw assembly;

FIG. 17 is a top plan view in half section of the wrap tool and wire gripper jaw assemblies illustrating the mounting means of same;

FIG. 19 is a full sectional view of the wrapping tool index adjustment assembly;

FIG. 20 is a front elevational view in partial section of the wrap tool assembly;

FIG. 21 is an exploded perspective view of the wrap tool clamping assembly;

FIG. 22 is a schematic diagram of a circuit suitable for wire color differentiation and identification;

DESCRIPTION OF THE PREFERRED EMBODIMENT

Figure 1:
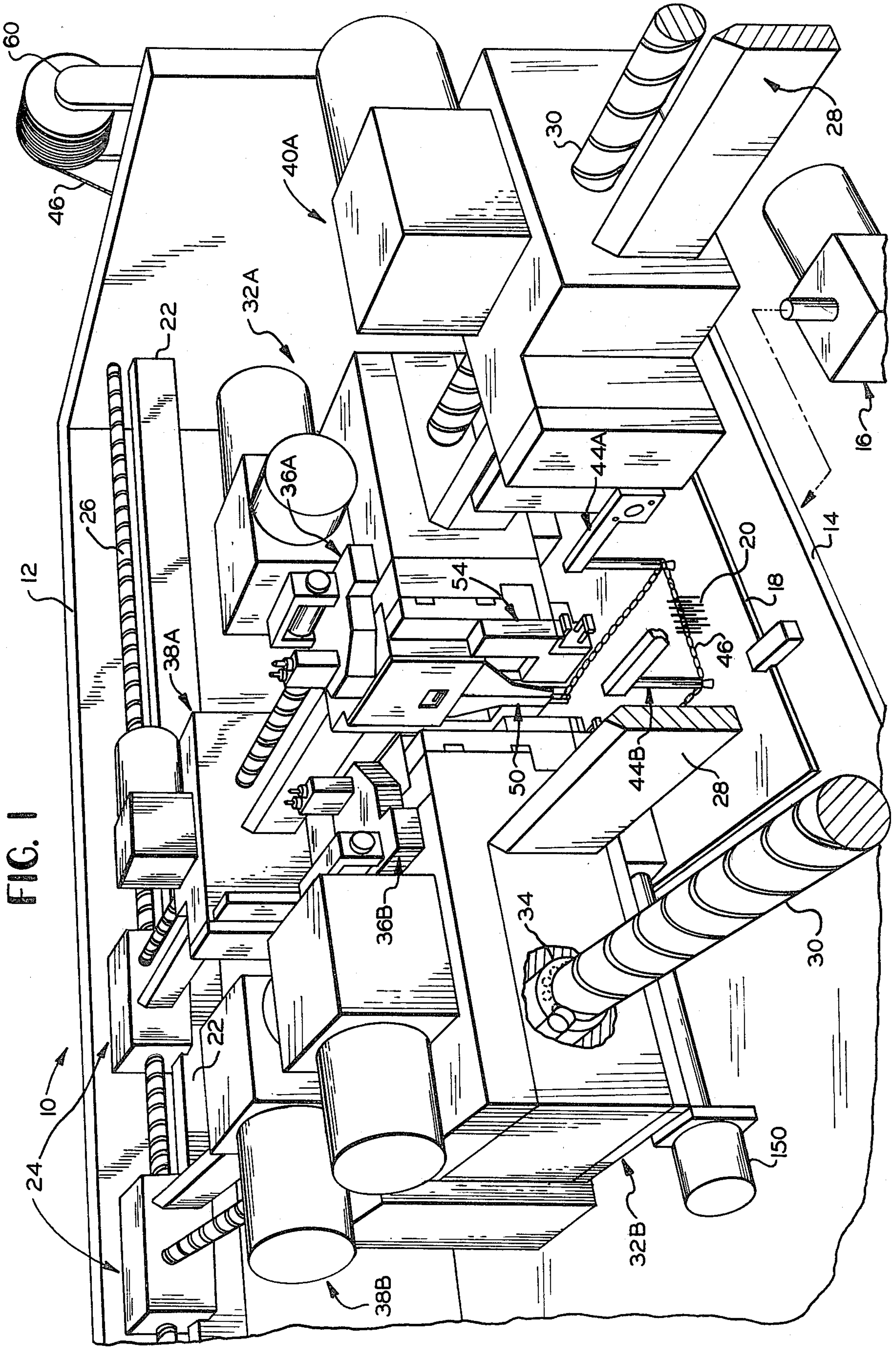
FIG. 1 is a perspective view of a twisted pair wiring apparatus embodying the instant invention.
Figure 2:
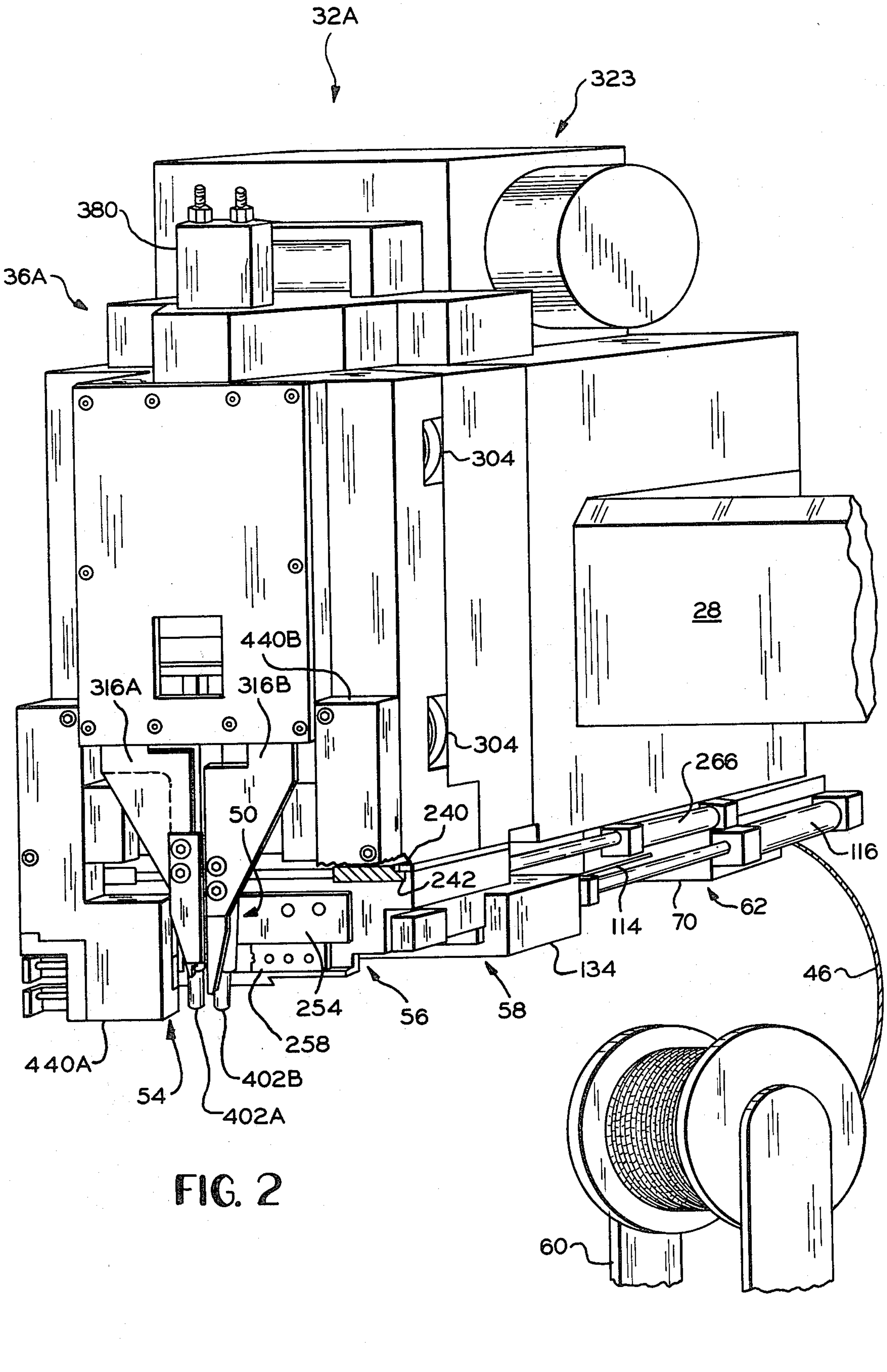
FIG. 2 is a perspective view of a wrap tool assembly and tool carriage.

With reference to FIGS. 1 and 2, an automatic apparatus for interconnecting pairs of terminals disposed in an array on an insulated panel with a pair of twisted, insulated conductors is generally illustrated by the reference numeral 10. As such, the apparatus 10 is of the general type disclosed in previously referenced U.S. Pat. Nos. 3,103,735 and 3,185,183 which are hereby incorporated by reference as if fully and completely set forth. The apparatus 10 includes a rigid frame 12 which supports a rotatable planar fixture 14. The fixture 14 may be selectively rotated and locked, preferably at 90° intervals, by an indexable drive and brake assembly 16 under the control of suitable electric or electronic means. The fixture 14 provides suitable mounting for a panel 18 which contains a plurality of uniformly spaced and arrayed terminals 20 disposed perpendicularly thereto.

The frame 12 includes structural members to which a pair of parallel tracks 22 are secured, one of which is illustrated in FIG. 1. The tracks 22 provide a horizontal course along which a pair of truck assemblies 24 may reversibly translate. Motor driven, rotatable ball screws 26 and pneumatic cylinders (not illustrated) under suitable sequenced control (not illustrated) may be utilized according to conventional practice to provide such reversible lateral translation which, in accordance with conventional wiring machine practice, is designated X-axis movement. Commonly, only one of the truck assemblies 24 is functionally tied to the ball screws 26 by a cooperating ball nut (not illustrated); X-axis movement of the other truck assembly 24 being achieved by juxtaposing the two truck assemblies 24 and locking them together with a suitably selectively activatable locking device (not illustrated) for simultaneous translation. Pneumatic cylinders may be utilized to drive the truck assemblies back into juxtaposition, an action commonly designated regroup. The truck assemblies 24 each include a support rail 28 which is rigidly secured between the ends of the truck assemblies 24 and a motor driven, rotatable ball screw 30 disposed in parallel, spaced-apart relationship with the rail 28.

A first tool carriage 32A and a second tool carriage 32B are disposed for bi-directional translation upon a respective one of the support rails 28. The tool carriages 32A and 32B are substantially identical, differing only in assemblies associated with the supply and severance of the twisted pair wire and will be described in greater detail subsequently. Specifically, a linear bearing assembly (not illustrated) functions as a friction reducing interface between the tool carriages 32A and 32B and an associated support rail 28. Reversible bi-directional translation of the tool carriages 32A and 32B along an axis perpendicular to the axis of translation of the truck assemblies 24 and therefore generally designated Y-axis movement is achieved by rotation of the ball screws 30 within a suitable recirculating ball nut assembly 34 secured within each of the tool carriages 32A and 32B. It should thus be apparent that the tool carriages 32A and 32B are arranged for substantially independent, reversible biaxial translation such that they may be positioned in any X and Y axis coordinate position over the face of the fixture 14, subject, of course, to the obvious limitation of mechanical interference of the components of the truck assemblies 24. Each of the tool carriages 32A and 32B includes a wrap tool assembly 36A and 36B, respectively, which are slidably mounted for linear travel normal to the plane of the panel 12 and fixture 14. Again, in accordance with conventional wiring machine practice, such translation is designated Z-axis movement. The wrapping tool heads 36A and 36B will be described in greater detail subsequently.

Similarly disposed upon the support rails 28 and the ball screws 30 of the truck assemblies 24 are a dual pair of dressing finger carriages 38A and 40A and 38B and 40B (not illustrated) disposed on linear bearings (not illustrated) for sliding Y-axis translation along the support rail 28 associated with tool carriage 32A or 32B. The dressing finger carriages 38A, 40A, 38B, and 40B include locking devices (not illustrated) which selectively lock them to the associated tool carriage 32A or 32B for translation therewith and they may thus be biaxially translated with the associated tool carriage to a desired Y-axis position and thence separated. The dressing finger carriages 38A, 38B, 40A, and 40B each also include clamping devices (not illustrated) which may be activated by the apparatus control to retain them in a desired Y-axis position after separation from the associated tool carriage 32A or 32B. The dressing finger carriages 38A and 40B are identical as are dressing finger carriages 38B and 40A. The dressing finger carriages 38A and 40A constitute a mirror image pair on opposite sides of the wrap tool carriage 32A and likewise the carriages 38B and 40B constitute a mirror image pair on opposite sides of the wrap tool carriage 32B. Each of the dressing finger carriages 38A, 38B, 40A, and 40B include dressing finger assemblies 42A, 42B, 44A, and 44B, respectively which may be moved from a retracted to an extended position to provide a fixed guide about which a pair of pretwisted wires 46 may be routed in order to achieve corners or bends therein. The structure and function of typical dressing finger carriages and assemblies is more fully described in U.S. Pat. No. 3,803,696 which is hereby incorporated by reference.

Figure 3:
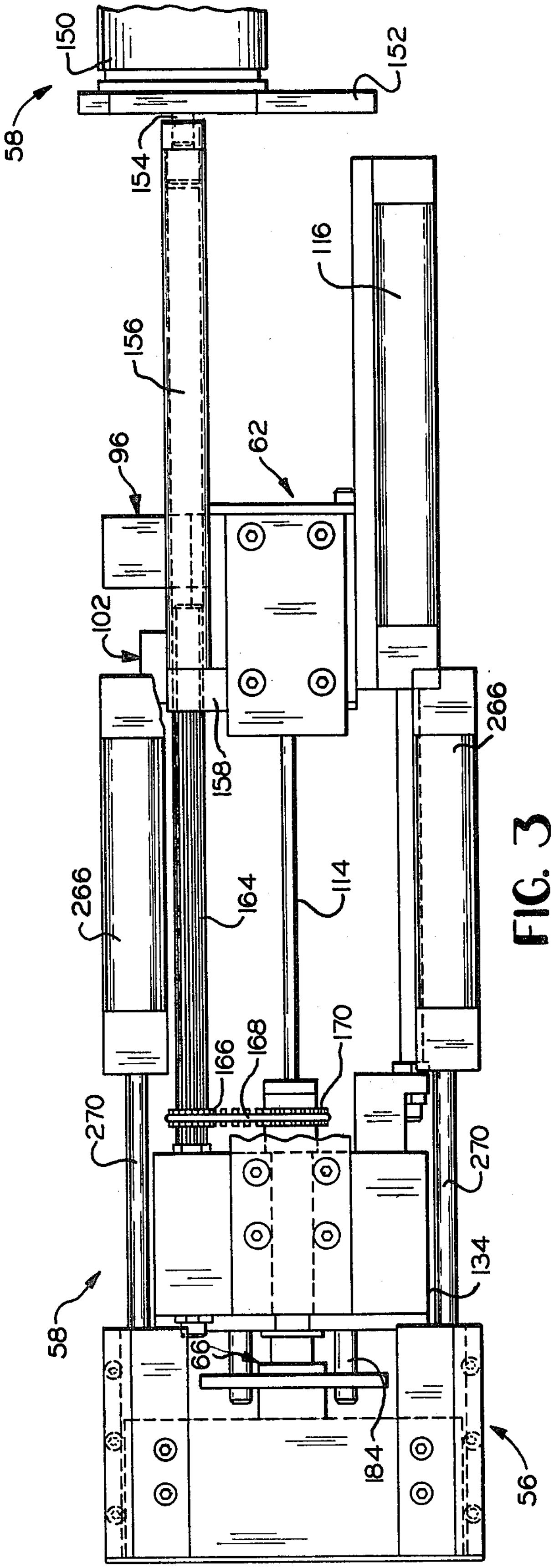
FIG. 3 is a top plan view of the wire supply and preparation mechanism of the tool carriages.

Referring now to FIGS. 2 and 3, the various assemblies which accomplish individual functions in connection with the overall operation of the twisted pair apparatus 10 will be described. At the outset, it should be recognized that although the majority of assemblies found in each of the tool carriages 32A and 32B are identical, certain differences between the tool carriages, related to the fact that the apparatus 10 utilizes a continuous length of twisted pair wire 46, do exist. Assemblies common to both the tool carriages 32A and 32B include a gripper jaw assembly 50, a wrap tool assembly 52, a wire positioning and identification assembly 54, a wire stripping assembly 56, and an untwist and tension assembly 58.

In addition to those assemblies common to both tool carriages 32A and 32B, the tool carriage 32A also has associated with it or includes the following assemblies which are related to the supply and severance of the twisted pair wire 46 and thus are not required in the tool carriage 32B: a wire supply 60, a wire feed and tension assembly 62 and a cut and clamp assembly 64. The twisted pair wire 46 is supplied to the tool carriage 32A and it, in turn, supplies the tool carriage 32B. It is therefore necessary that the tool carriage 32B include means for receiving the free end of the twisted pair wire 46. The tool carriage 32B includes a feed tube assembly 66 which guides the twisted pair wire 46 between the two tool carriages 32A and 32B and a clamp assembly 68. All of the above noted assemblies will be described in greater detail below.

Figure 7:
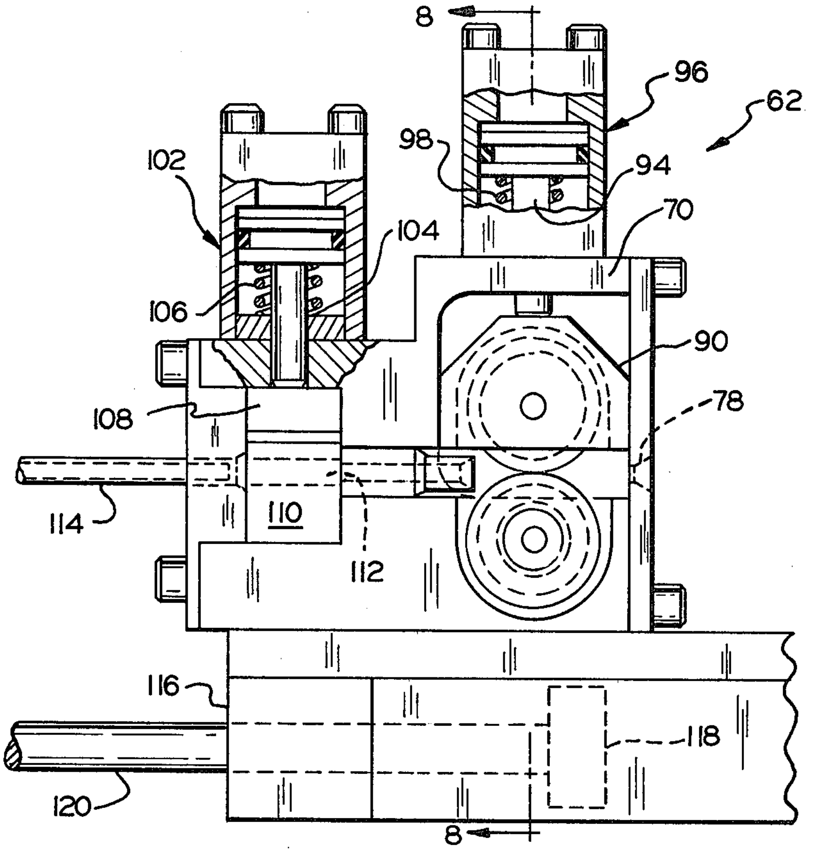
FIG. 7 is a top full sectional view of the wire feed and tension assembly of the first tool carriage taken along line 7—7 of FIG. 6.
Figure 8:
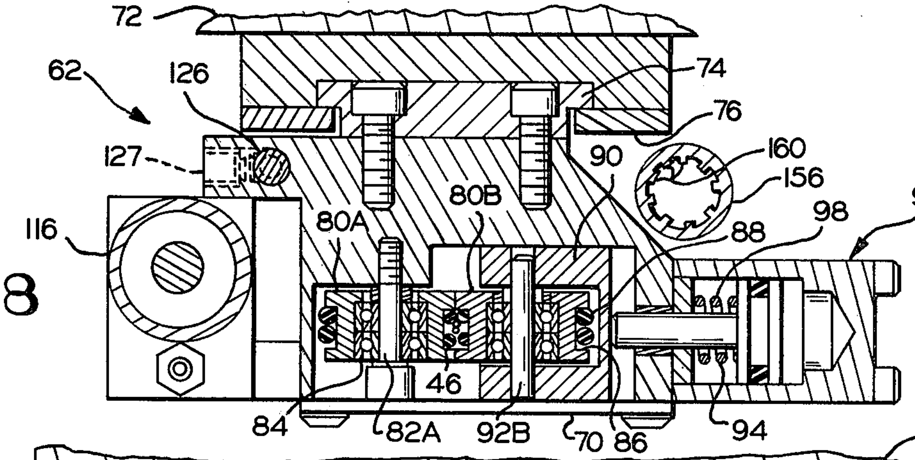
FIG. 8 is a side full sectional view of the wire feed and tension assembly of the first tool carriage taken along line 8—8 of FIG. 7.

Referring now to FIGS. 3, 7, and 8, the wire feed and tension assembly 62 utilized only in the first tool carriage 32A comprehends a generally rectangular housing 70 which is slidably suspended to the underside of a horizontal frame 72 which forms a portion of the tool carriage 32A by cooperating undercut lips 74 and 76 secured to the housing 70 and the frame 72, respectively. The housing 70 defines an inlet aperture 78 through which the twisted pair wire 46 enters the feed and tension assembly 62. Within the housing 70 are a pair of rollers 80A and 80B disposed for rotation on stub shafts 82A and 82B by means of suitable anti-friction bearings 84. The rollers 80A and 80B each define a circumferential re-entrant groove 86 within which is seated a pair of resilient elastomeric O-rings 88. Whereas the roller 80A and associated stub shaft 82A are fixably secured within the housing 70, the roller 80B and associated stub shaft 82B are secured for translation within a yoke 90. The yoke 90 is slidably positioned within a suitable cavity 92 of the housing 70 which constrains the yoke 90 to movement along one axis. Generally aligned for movement along this axis is a piston and rod 94 which is a component of a piston and cylinder assembly 96. The piston and cylinder assembly 96 is of conventional design and provides a force against the yoke 90 in proportion to the pressure of air supplied thereto. A compression spring 98 biases the piston and rod 94 in a direction away from the yoke 90 to assure that a reduction of air pressure to the piston and cylinder assembly 96 is accompanied by a corresponding reduction in the pressure applied to the yoke 90. The piston and cylinder assembly 96 thus provides an adjustable compressive force to the O-rings 88 between which the twisted pair wire 46 passes. In turn, the O-rings 88 provide controllable drag or tension as the wire 46 passes through the other assemblies of the tool carriage 32A and also assist the removal of axial irregularities such as kinks and bends in the wire 46.

The wire feed and tension assembly 62 further includes a second piston and cylinder assembly 102 which provides a variable force proportional to the pressure of air supplied thereto to a piston and rod 104. The piston and cylinder assembly 102 is conventional and includes a compression spring 106 disposed concentrically about the piston rod 104. The compression spring 106 provides a restoring force which biases the piston and rod 104 toward the position illustrated in FIG. 7. Slidably disposed adjacent the terminus of the piston rod 104, in a suitable cavity of the housing 70, is a T-shaped wire clamp 108, the control member of which nests within a U-shaped anvil 110. The T-shaped clamp 108 and U-shaped anvil 110 together define a collapsible passageway 112 through which the twisted pair wire 46 passes. Activation of the piston and cylinder assembly 102 provides a compressive force against the T-shaped wire clamp 108, reducing the height of the passageway 112 and tightly gripping the twisted pair wire 46. The feed and tension assembly 62 further includes an elongate hollow tube 114 which is secured to the housing 70 and extends therefrom toward the untwist and tension assembly 58. Finally, the feed and tension assembly 62 includes a conventional double-acting pneumatic cylinder 116 secured to the housing 70. Compressed air is supplied to one side or the other of a piston 118 which is slidably disposed within the cylinder 116 and secured to an elongate piston rod 120. The terminus of the piston rod 120 is secured by means of suitable fasteners 122 to the untwist and tension assembly 58.

Figure 5:
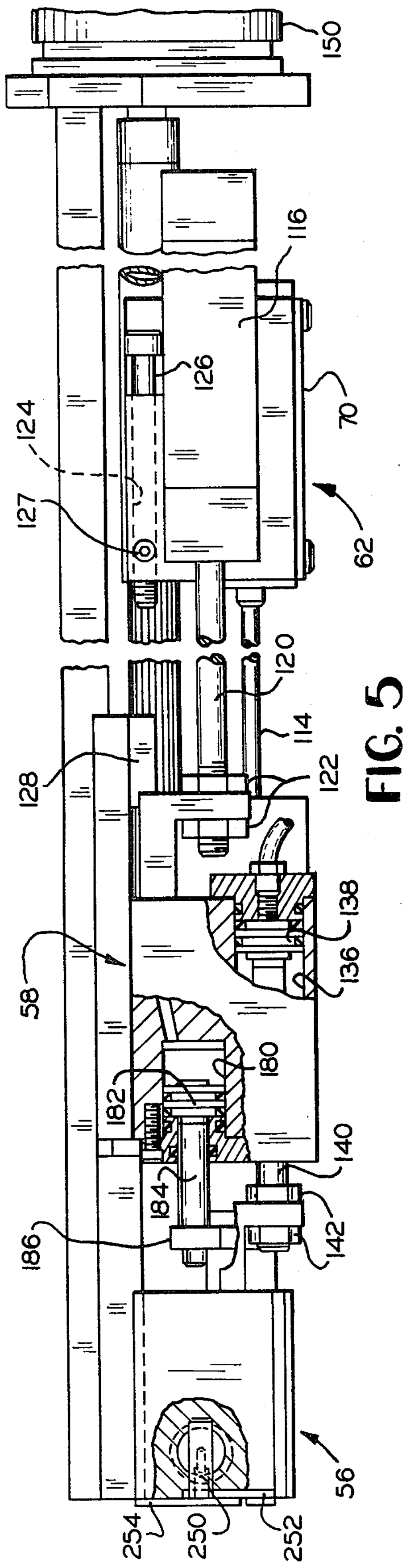
FIG. 5 is a side elevational view in partial section of the wire supply and preparation mechanism of the tool carriages.

Referring briefly to FIG. 5, the housing 70 of the wire feed and tension assembly 62 defines a threaded passageway 124 within which a complementarily threaded adjustment screw 126 is positioned. A threaded set screw 127 disposed on an intersecting axis normal to the axis of the adjustment screw 126 serves to selectively tightly retain the screw 126 in a desired axial position. A stop 128 is secured to the horizontal frame 72 in axial alignment with the adjustment screw 126 by suitable fastening means. Selective supply and release of compressed air from the cylinder 116 translates the piston 118 and the piston rod 120 resulting in bi-directional relative translation between the wire feed and tension assembly 62 and the untwist and tension assembly 58. The extent or forward limit of linear translation of the feed and tension assembly 62 may be adjusted by appropriate positioning of the adjustment screw 126.

Figure 9:
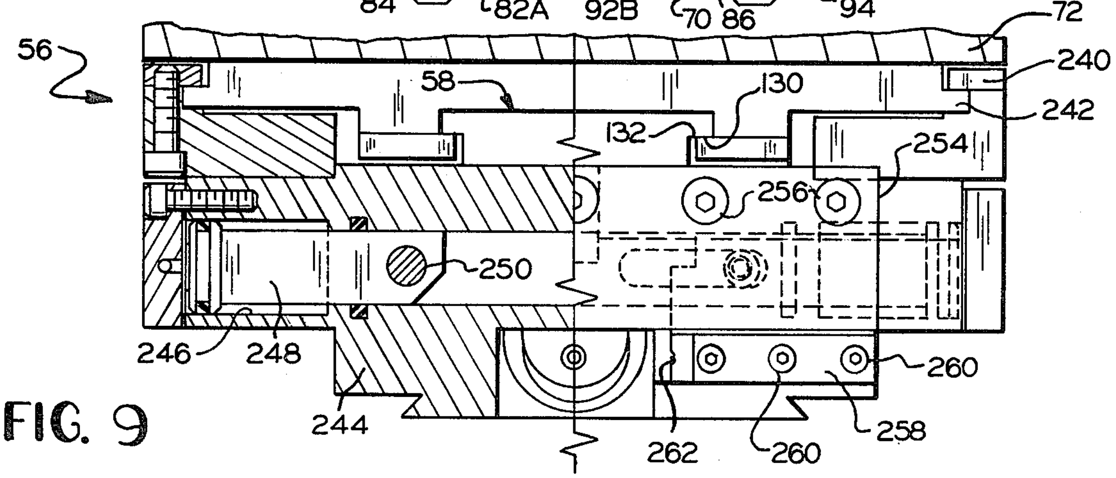
FIG. 9 is a front, elevational view in half section of the wire stripping assembly of the wire supply and preparation mechanism of the tool carriages.

The untwist and tension assembly 58, to be described next, is utilized in both the first tool carriage 32A and the second tool carriage 32B. Referring now first of all to FIGS. 3 and 9, the untwist and tension assembly 58 is slidably suspended to the underside of the frame 72 of the tool carriages 32A and 32B by cooperating undercut lips 130 and 132 which form a portion of the frame 72 and a rectangular housing 134 of the untwist and tension assembly 58, respectively. The rectangular housing 134 defines a plurality of through passageways and cavities which define two pairs of pneumatic cylinders.

Figure 4:
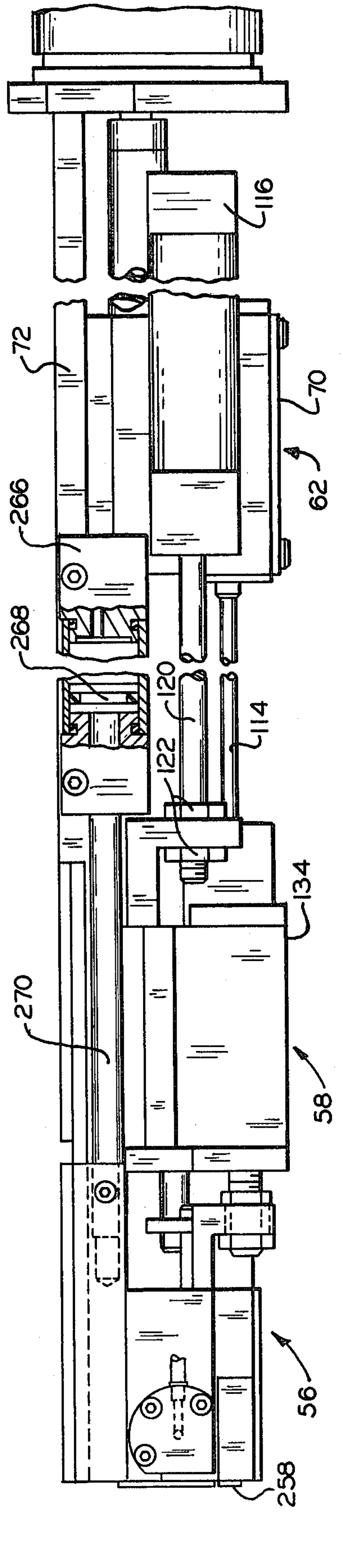
FIG. 4 is a side elevational view in partial section of the wire supply and preparation mechanism of the tool carriages.

Referring now to FIGS. 4 and 5, the housing 134 defines a first pair of double acting pneumatic tensioning cylinders 136. The tensioning cylinders 136 are disposed in the lower portion of the housing 134 symmetrically adjacent its left and right vertical sidewalls, the housing 134 defining appropriate air supply passages. The cylinders 136 are conventional and each includes a piston 138 secured to an elongate piston rod 140 which extends toward the stripper assembly 56. The terminal portions of each of the piston rods 140 are secured by suitable fasteners 142 to the stripper assembly 56. Thus, supply and release of pressurized air to the cylinders 136 drives the piston rod 140 bi-directionally and translates the untwist and tension assembly 58 and specifically the housing 134 relative to the stripper assembly 56.

Figure 6:
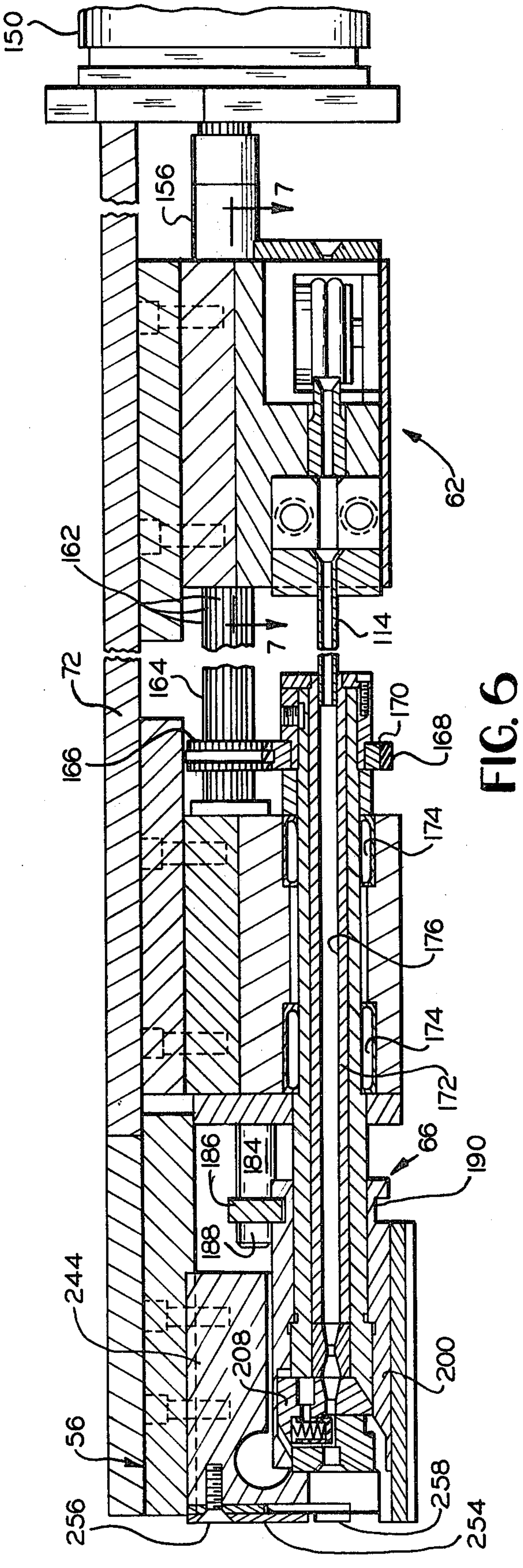
FIG. 6 is a full sectional side view of the wire supply and preparation mechanism of the first, i.e., wire feeding tool carriage.

Referring now to FIGS. 3 and 6, the untwist and tension assembly 58 also includes a stepping motor 150 which may be programmably driven according to conventional stepping motor practice. The stepping motor 150 is secured to a vertical plate 152 which is in turn secured to the horizontal frame 72. The stepping motor includes an output shaft 154 to which an elongate, hollow drive tube 156 is tightly secured. The drive tube 156 extends toward and is rotatably positioned within a journal bearing 158 mounted upon the housing 70 of the wire feed and tension assembly 62. The inside wall of the hollow drive tube 156 defines a plurality of axially disposed female splines which engage complementary male splines 162 disposed on the outer surface of a second elongate drive shaft 164. The splined drive shaft 164 is thus both capable of telescoping within the hollow elongate drive tube 156 as well as transferring the rotational motion of the stepping motor 150 to the untwist and tension assembly 58. The terminal portion of the splined drive shaft 164 extending into the housing 134 is supported for rotation by suitable journal or anti-friction bearings (not illustrated) and is restrained against axial motion by suitable means such as a collar or C-washer (not illustrated). Secured to the splined drive shaft 164 for rotation therewith is a pulley 166 suitable for driving a timing drive belt 168. The timing belt 168 transfers the rotation of the stepping motor 150 to a second pulley 170 secured about an elongate spindle 172.

Referring now briefly to FIG. 6, the elongate spindle 172 may, due to manufacturing considerations, comprise nested tubes and guides rather than a single machined piece and is supported within the housing 134 by suitable anti-friction devices such as needle bearings 174. The elongate spindle 172 defines a centrally disposed passageway 176 within which the feed tube 114 extending from the feed and tension assembly 62 is nested. The inner diameter of the passageway 176 is slightly larger than the outside diameter of the feed tube 114 and thus the spindle 172 may rotate freely about the non-rotating feed tube 114 and the feed tube 114 may translate freely along the axis of the passageway 176.

Referring now to FIGS. 4, 5 and 6, the housing 134 defines a second pair of cylinders 180 disposed in the upper portion of the housing 134, generally adjacent its center. The housing 134 further defines suitable air passages to the cylinders 180 which are of conventional double acting configuration. As such, each includes a piston 182 secured to an elongate piston rod 184 extending from the cylinder 180 toward the stripper assembly 56. The piston rods 184 of each of the pistons 182 are secured to a laterally extending draw bar 186 by suitable fasteners 188. The draw bar 186 seats within a circumferential re-entrant groove 190 formed adjacent one end of a cylindrical actuator housing 200. The actuator housing 200 is keyed for rotation with the spindle 172 but is free to translate axially relative thereto in response to bi-directional forces generated by the pistons 182 within the cylinders 180.

Figure 12:
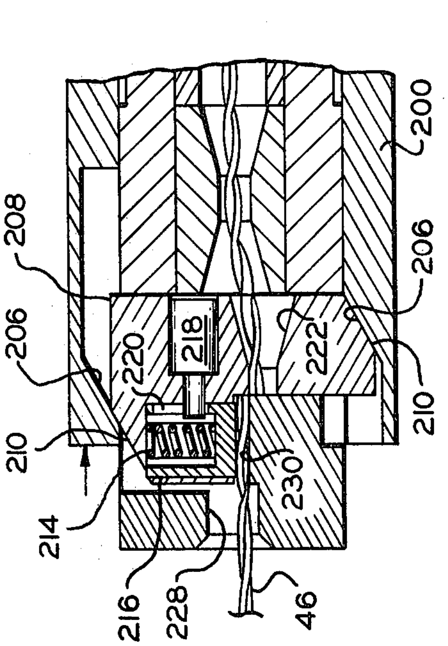
FIG. 12 is an enlarged, fragmentary full sectional view of the cutting and clamping mechanism utilized in the first tool carriage.
Figure 13:
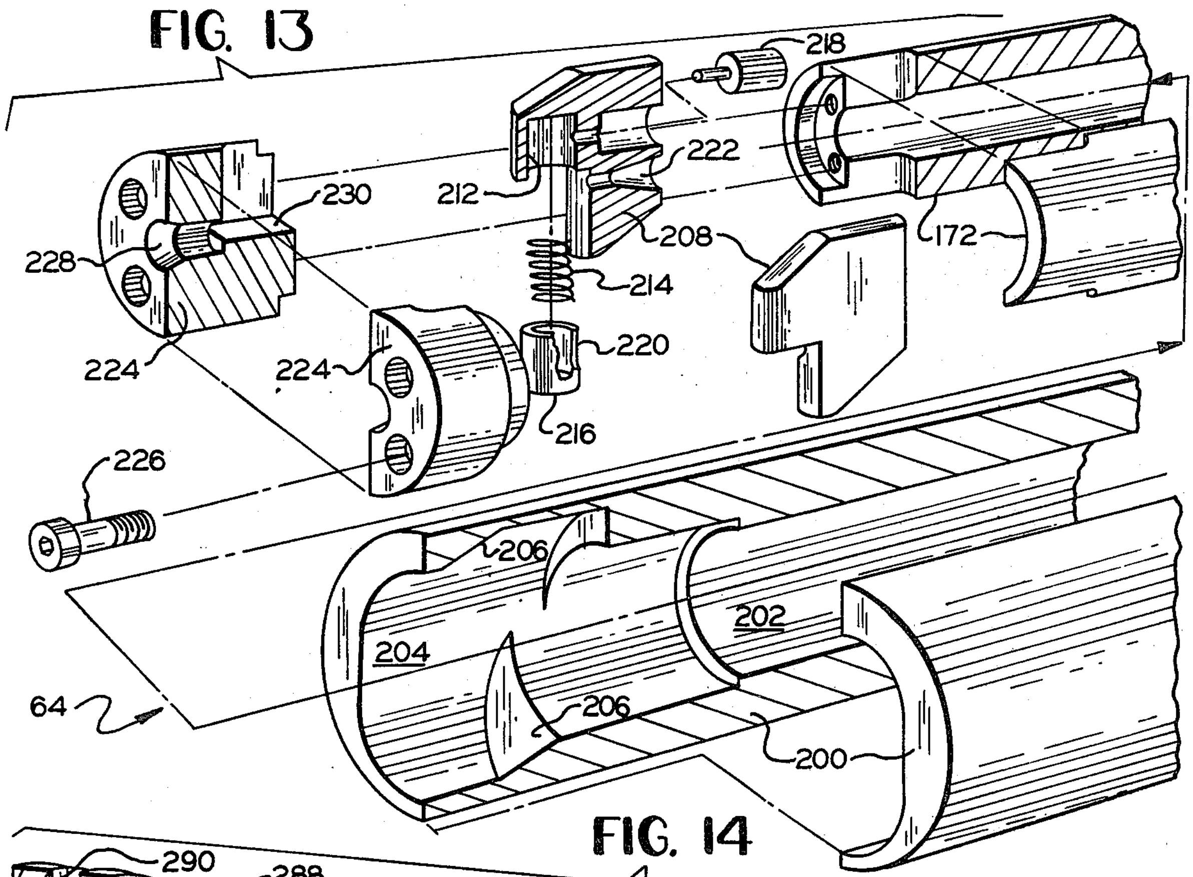
FIG. 13 is an exploded perspective view of the wire cutting and clamping assembly of the first tool carriage.

Referring now to FIGS. 6, 12 and 13, the cylindrical actuator housing 200 contains the components of the cut and clamp assembly 64 which is found only on the first tool carriage 32A. The housing 200 defines a generally axially oriented through passageway 202 having an offset portion 204 defined by two oblique ramps 206. The oblique ramps 206 are disposed on diametrically opposed wall portions of the axial passageway 202. A clamp block 208 is positioned generally within the offset portion 204 of the housing 200 adjacent the oblique ramps 206 and between the bifurcated end of the spindle 172. The clamp block 208 includes a pair of oblique ramps 210 inclined similarly to the pair of oblique ramps 206 in the actuator housing 200. The clamp block 208 enjoys limited freedom of translation along a radial axis but is restrained against axial translation by virtue of its disposition adjacent the terminus of the elongate spindle 172. The clamp block 208 includes a recessed cavity 212 within which is disposed a compression spring 214 and a hollow, cylindrical clamp button 216. A retaining pin 218 which may be frictionally secured within appropriate passageways in the clamp block 208 seats within a longitudinal slot 220 disposed in the sidewall of the clamp button 216 limiting the axial excursion thereof. The clamp block 208 further defines a frusto-conical passageway 222 through which the twisted pair wire 46 is drawn. The cut and clamp assembly 64 further includes a spindle cap section 224 which is secured by suitable fasteners 226 to the elongate spindle 172. The spindle cap section 224 defines an outlet passageway 228 through which the twisted pair wire 46 may pass and further includes an anvil surface 230 immediately adjacent the passageway 228 against which the clamp button 216 may apply pressure to clamp and restrain the twisted pair wire 46. The anvil surface 230 of the cap section 224 terminates with a sharp, right angle edge adjacent the clamping block 208 and the edges of the frusto-conical passageway 222 adjacent the cap section 224 in the clamping block 208 likewise are sharp and right angular.

Referring now to FIGS. 6, 12 and 13, activation of the cut and clamp assembly 64 comprehends supply of pressurized air to the appropriate chambers of the cylinders 180 which drives the piston rod 184, the draw bar 186, and the actuator housing 200 toward the housing 134 of the untwist and tension assembly 58. Such translation of the actuator housing 200 drives the clamp block 208 radially from the position illustrated in FIG. 6 to the position illustrated in FIG. 12 to sever the twisted pair wire 46 by shearing along the line of intersection of the spindle cap section 224 and the clamping block 208 as well as clamping the end of the severed wire 46 extending out the passageway 228 in the cap section 224 between the clamp button 216 and the anvil surface 230.

Referring now to FIGS. 5, 6, and 9, the stripper assembly 56 which is found in both the first tool carriage 32A and second tool carriage 32B is suspended from the underside of the horizontal frame 72 by structures identical to those mounting the previously described assemblies, i.e., a pair of cooperating undercut lips 240 and 242 secured to the stripper assembly 56 and horizontal frame 72, respectively. The stripper assembly 56 includes a generally rectangular housing 244 which defines a pair of laterally oriented, coaxially aligned, double acting pneumatic cylinders 246. The pneumatic cylinders 246 are conventional and each includes a piston assembly 248 as well as suitable air passageways defined within the housing 244 to provide pressurized air to one side or the other of the piston assemblies 248. The piston assemblies 248 each include a pin 250 disposed transversely to the axis of their translation which may be secured to the piston assemblies 248 by frictional engagement or other suitable securement means. The pins 250 extend beyond the front of the housing 244 and engage suitably dimensioned openings in a vertically disposed laterally translating plate 252 which is retained adjacent the face of the housing 244 by an overhanging retaining plate 254. The retaining plate 254 may be secured to the housing 244 by suitable threaded fasteners 256. A stripping blade 258 is secured to each of the laterally translating plates 252 by suitable threaded fasteners 260 which facilitate simple and rapid replacement of the stripping blades 258. The stripping blades 258 each define a pair of vertically aligned semi-circular openings 262 which are appropriately sized to accept the diameter of a selected conductor size of the twisted pair wire 46. The edges of the stripper blades 258 are preferably tapered and sharpened according to conventional mechanical wire stripping practice. Selective application and release of compressed air to opposite or adjacent faces of the piston assemblies 248 translated the plates 252 and specifically the stripper blades 258 toward or away from one another, respectively.

Referring now to FIGS. 3, 4 and 5, reference is made to the wire stripper assembly 56 which is slidably mounted to the underside of the horizontal frame 72. Bidirectional translation of the wire stripper assembly 56 as well as the untwist and tension assembly 58, serially linked to the wire stripper assembly 56 through the piston rod 140, and the wire feed and tension asssembly 62, serially, linked to the untwist and tension assembly 58 by the piston rod 120, is accomplished by a pair of double acting pneumatic cylinders 266. The pair of cylinders 266 are each fixedly secured to the horizontal frame 72 and include suitable air passageways for providing pressurized air to one or other side of a respective pair of pistons 268 secured to a respective pair of elongate piston rods 270. Application of compressed air to the piston 268 thus not only translates the stripper assembly 56, but also the assemblies 58 and 62.

The wire stripping operation itself is performed in both the tool carriage assemblies 32A and 32B in the same manner. First, the pair of stripper blades 258 are driven into abutting contact to score and substantially sever the insulation which concentrically surrounds the conductors of the twisted pair wire 46. According to conventional mechanical wire stripping practice, the blades 258 will be sized and adjusted to sever the insulation surrounding the conductor of the twisted pair wire 46 without nicking or damaging the conductors themselves. Axial removal of the insulation is then achieved by activating the pair of cylinders 266 and sliding the entire wire stripper assembly 56 as well as the associated assemblies delineated above toward the right as viewed in the drawing figures. As will be more fully explained subsequently, the twisted pair wire 46 is restrained by the gripper jaw assembly 50 and, thus, the insulation about the twisted pair wire 46 is expeditiously removed.

Figure 10:
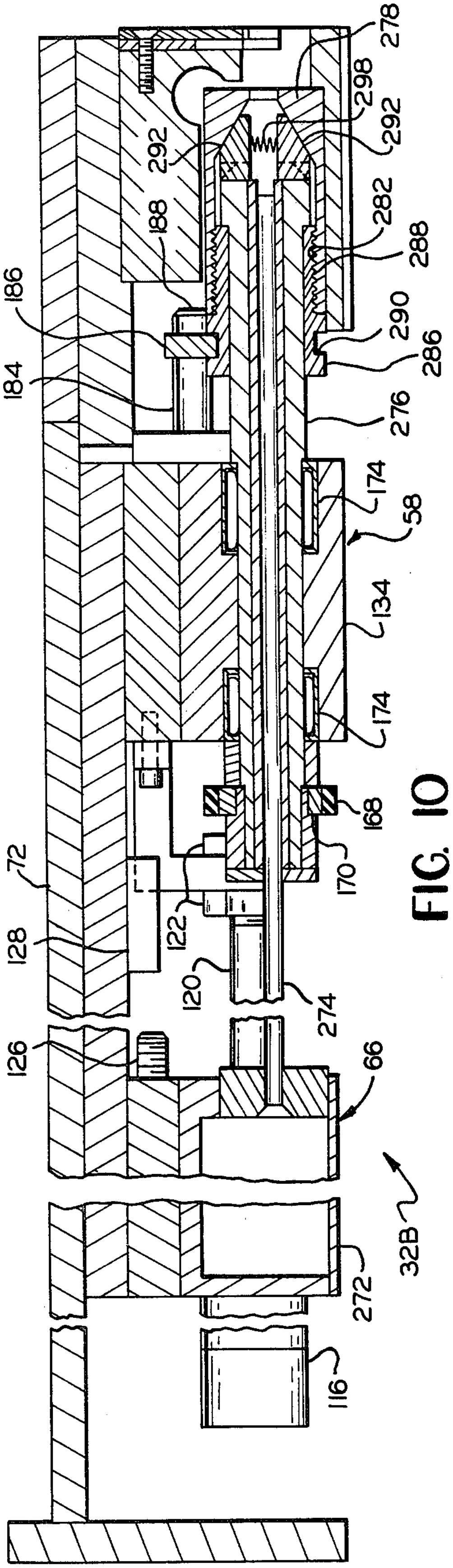
FIG. 10 is a full sectional side view of the wire preparation mechanism of the second, i.e., wire receiving tool carriage.

As noted above, a majority of the assemblies found in the first tool carriage 32A and the second tool carriage 32B are identical. Inasmuch as only the first tool carriage 32A receives the continuous length of twisted pair wire 46 whereas the second tool carriage 32B merely receives the severed end of the twisted pair wire 46, certain distinctions, related to this functional dissimilarity do exist. That only the second tool carriage 32B includes the feed tube assembly 66 is one such distinction. Referring now to FIG. 10, the feed tube assembly 66 has a mounting block 276 slidably disposed on the underside of the horizontal frame 72 by means of cooperating undercut lips (not illustrated) identical to those utilized to mount the wire feed and tension assembly 62 to the underside of the horizontal frame 72 of the tool carriage 32A. The mounting block 276 is analogous to the housing 70 of the wire feed and tension assembly 62, but includes none of the internal components of said assembly. Rather, it provides a translating mounting for an elongate hollow feed tube 278 which extends substantially the full length of the tool carriage 32B. The feed tube assembly 66 also includes the pneumatic cylinder 116 and the piston rod 120 which are identical in structure and similar in function to the like numbered components of the first tool carriage 32A. The piston rod 120 is secured by suitable fasteners 122 to the housing 134 of the untwist and tension assembly 58. The feed tube assembly 66 likewise includes a threaded adjustment screw 126 disposed without a complimentarily threaded passageway 124 within the mounting block 276. A set screw (not illustrated) identical in structure and function to the set screw 127 of the tool carriage 32A may be utilized to maintain the threaded adjustment screw 126 in a desired position. A stop 128 which is identical to the stop 128 of the tool carriage 32A is secured to the underside of the horizontal frame 72 in axial alignment with the threaded adjustment screw 126. Activation of the pneumatic cylinder 116 translates the feed tube assembly 66 and specifically the elongate hollow feed tube 274 from the position illustrated in FIG. 10 to that illustrated in FIG. 11. The precise extent or forward limit of translation is set by the adjustment screw 126. The elongate hollow feed tube 274 provides a conduit which receives and routes the twisted pair wire 46 between the first tool carriage 32A and the second tool carriage 32B during the regroup operation in a manner to be more fully described subsequently.

Figure 14:
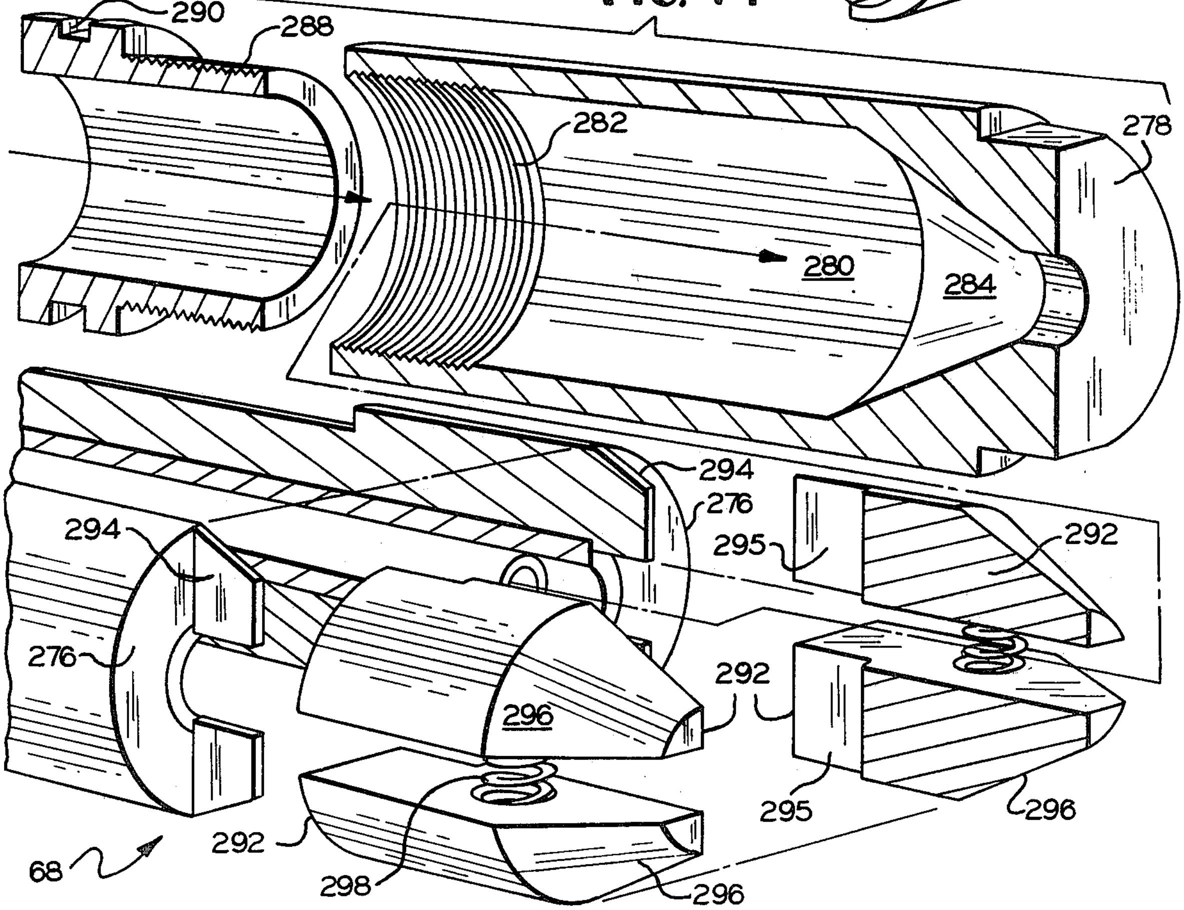
FIG. 14 is an exploded perspective view of the wire clamping assembly of the second tool carriage.

Referring now to FIGS. 10 and 14, the clamp assembly 68 of the second tool carriage 32B includes an elongate spindle 276 which is analogous to the spindle 172 of the tool carriage 32A. The elongate spindle 276 is rotatably disposed within suitable needle bearings 174 positioned within the housing 134 of the untwist and tension assembly 58. The elongate spindle 276 is rotatably driven by a stepping motor 150 (illustrated in FIG. 1) through the associated components described in connection with the first tool carriage 32A. Thus, programmed rotation of the stepping motor 150 is transferred to the elongate spindle 276 through a timing belt 168 which is received within a pulley 170 secured to the spindle 276. Concentrically disposed about the spindle 276 is a cylindrical housing 278 which defines a central passageway 280 having female threads 282 at one end and a tapering frusto-conical surface 284 at the other. A hollow bushing 286 includes complimentary male threads 288 disposed about its outer surface and defines a circumferential re-entrant groove 290 within which a laterally extending draw bar 186 is received. Positioned adjacent the frusto-conical surface 284 of the housing 278 are a pair of clamp blocks 292 which are stabilized by a pair of forwardly projecting tabs 294 on the face of the elongate spindle 276 which seat within matching slots 295. Each of the pair of clamp blocks 292 define a truncated frusto-conical surface 296 which rests in sliding contact against the frusto-conical surface 284 of the housing 278. Finally, the clamp assembly 68 includes a pair of compression springs 298 positioned between the pair of clamp blocks 292 in suitable blind openings. The compression springs 298 bias the pair of clamp blocks 292 away from one another into intimate contact with the frusto-conical surface 284 of the cylindrical housing 278. With the elongate hollow feed tube 274 in its retracted position illustrated in FIG. 10, compressed air may be supplied to the appropriate side of the cylinders 180 of the untwist and tension assembly 58 to retract the piston rod 184 and the draw bar 186 seated with the re-entrant groove 290 and translate the cylindrical housing 278 relative to the elongate spindle 276. Such relative translation drives the pair of clamp blocks 292 toward one another, reducing the space therebetween, and tightly gripping the twisted pair wire 46.

Referring now to FIGS. 15, 16, and 17, the gripper jaw assembly 50 is disposed on the forward portion of each of the tool carriages 32A and 32B. The gripper jaw assembly 50 associated with each of the tool carriages 32A and 32B is, as previously stated, identical and it will therefore be described only with reference with the first tool carriage 32A. The gripper jaw assembly 50 includes a generally U-shaped housing 300 which extends generally about the forward portion of the wrap tool assembly 36A. The housing 300 is mounted for vertical translation with the wrap tool assembly 36A by means of a pair of opposed vertical rails 302 which translate along axes defined by a left and right pair of idler wheel and anti-friction bearing assemblies 304. The U-shaped housing 300 defines suitable air passageways which communicate with a pair of vertically disposed elongate cylinders 306. Slidably positioned within each of the cylinders 306 is an elongate piston 308. The cylinders 306 are of conventional double-acting design and, thus, the pistons 308 may be actively driven to either an upper or lower position by the selective application of compressed air. A compression spring 309 is disposed between the lower portion of the left piston 308 to provide an upward restoring force to the left piston 308 for reasons to be more fully described subsequently. Each of the pistons 308 defines a transverse notch 310 within which a transfer block 312 is slidably disposed. The transfer block 312 is secured to a vertically extending gripper jaw arm 314. Each of the gripper jaw arms 314 is constrained to move along an oblique axis of approximately 30° to the vertical by cooperating pairs of pins and slots 315 secured to the housing 300 and defined by the gripper jaw arms 314. The left gripper jaw arm 314 which is associated with the piston 308 having the compression spring 309 is terminated by a first gripper jaw 316A and the right gripper arm 314 is terminated by a right gripper jaw 316B. The left gripper jaw 316A includes a guide plate 317 secured to its forward surface which overlaps the forward surface of the right gripper jaw 316B. Each of the gripper jaws 316A and 316B define vertically disposed re-entrant grooves 318 suitably sized to receive the terminal pins 20 during the wrapping operation. Finally, the left gripper jaw 316A of the gripper jaw assembly 50 defines a wire receiving notch 319 adjacent its lower extremity. The width of the notch 319 is sized to tightly grip the twisted pair wire 46 without damaging or deforming either the conductors or insulation.

Referring briefly to FIGS. 2 and 15, the operation of the gripper jaw assembly will be described. Selective supply of compressed air to the left and right cylinders 306 drives the left gripper jaw 316A and the right gripper jaw 316B along the axis previously described from the closed position illustrated in FIG. 15 to the open position illustrated in FIG. 2. It should be appreciated that the gripper jaws 316A and 316B may be moved independently or simultaneously between the fully opened position illustrated in FIG. 2 and the fully closed position illustrated in FIG. 15.

Figure 18:
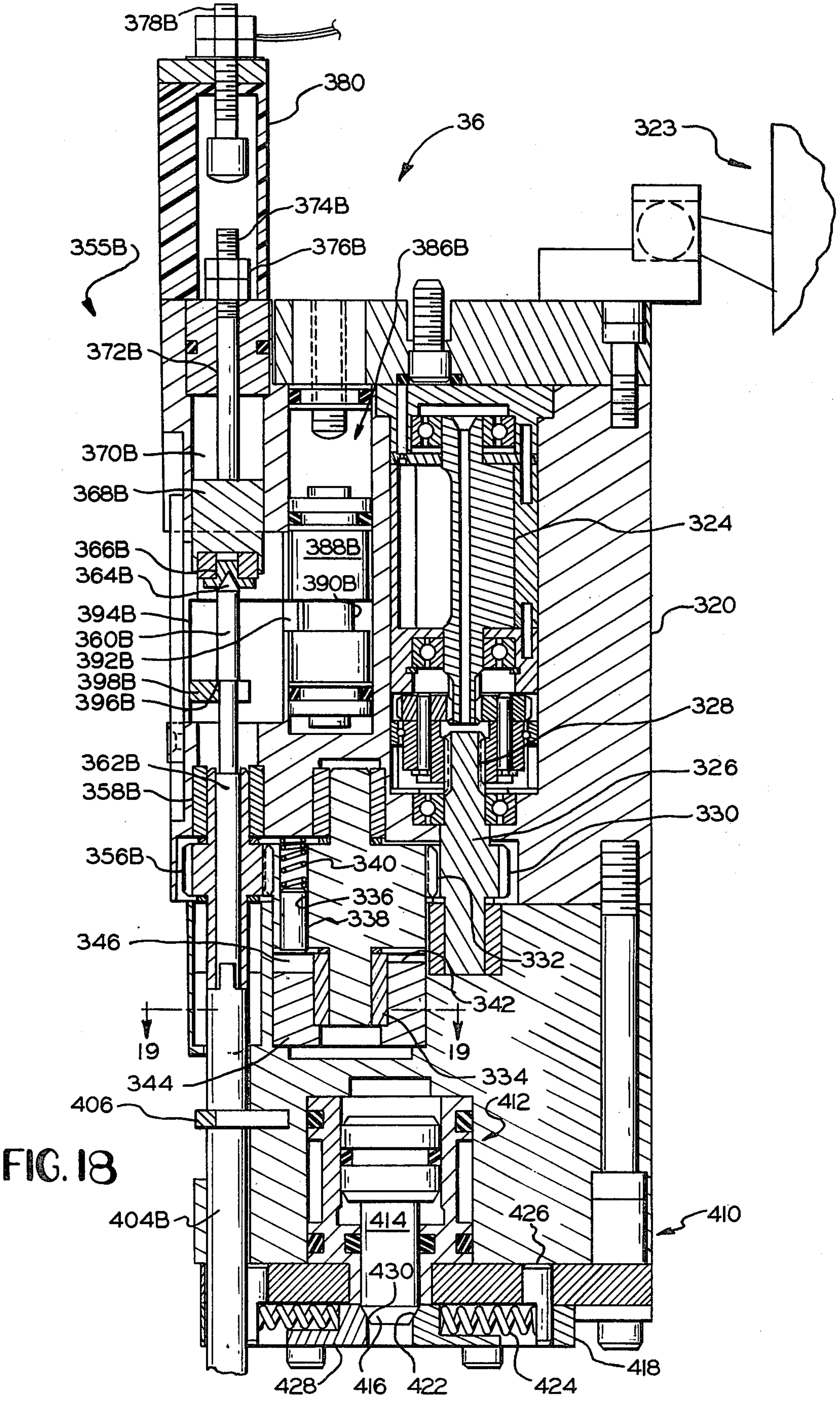
FIG. 18 is a full sectional view of the wrap tool assembly.

Referring now to FIGS. 1, 17, and 18, the wrap tool assemblies 36A and 36B are each enclosed within a housing 320 which is disposed for vertical, i.e., Z-axis translation within the respective tool carriage 32A or 32B by means of vertically oriented linear bearing assemblies 322. A Z axis drive assembly 323 which is conventional and thus will not be more fully described, is secured to each of the tool carriages 32A and 32B. The drive assembly 323 provides proper Z axis positioning of the wrap tool assemblies 36A and 36B and the gripper jaw assemblies 50A and 50B which translate therewith during the wrapping operation as will be more fully described subsequently.

Referring now to FIG. 18, the housing 320 provides mounting for a conventional bi-direction vane motor 324 which is selectively supplied with compressed air through appropriate passageways (not illustrated). The vane motor 324 drives an axially aligned output shaft 326 through a splined interconnection 328 which facilitates service and replacement of the vane motor 324. The drive shaft 326 includes spur gear teeth 330 disposed about a portion of its length which engages and transfers power to a larger pinion gear 332. The pinion gear is rotatably supported in appropriate bearings 334. The pinion gear 332 includes a through aperture 336 which is parallel to and spaced from its axis of rotation and contains a pawl 338 which is biased in the downward direction illustrated in FIG. 18 by a compression spring 340. The pawl 338 rides on a helical surface 342 which forms the upper face of an adjustment collar 344. The helical surface 342 is of right-hand sense and includes a vertical discontinuity defined by the wall or step 346. Coaction between the spring biased pawl 338 and the helical surface 342 and the vertical step 346 of the adjustment collar 344 permits rotation of the pinion gear 332 in the counter-clockwise direction as viewed from above. Rotation of the pinion gear 332 in the opposite direction, however, may be achieved only for less than one revolution, until interference between the pawl 338 and the vertical step 346 inhibits rotation. The precise radial position of interference dictates the indexed positions of the wrapping tools and is adjustable by means of the mechanism illustrated in FIG. 19.

Referring briefly to FIG. 19, the mechanism for adjusting the indexed position 19 of the pinion gear 332 is illustrated. The collar 344 defines a pair of opposed recesses 348 which define a radially extending web 350. Adjacent the opposed surfaces of the web 350 are a pair of threaded adjusting screws 352 which may be cooperatively advanced or retracted to rotate the collar 344, adjust the relative position of the vertical step 346 and thus, the indexed position of the gear pinion 332 due to interference between the pawl 338 and the step 346.

Referring again to FIG. 18 and also to FIG. 20, it is apparent that each of the wrap tools 36A and 36B includes a pair of wrap tool drive assemblies 355A and 355B. With the exception of the serial drive configuration, these assemblies are identical and operate independently of one another, thus only the right drive assembly 355B, illustrated in FIG. 18 will be fully described. The pinion gear 332 meshes with and transfers rotational power to a first drive gear 356B, thence to a second drive gear 356A. In the drive or wrap mode, the pinion gear 332 rotates counter-clockwise, the first drive gear 356B rotates clockwise and the second drive gear 356A rotates counter-clockwise. The drive gear 356B is disposed within suitable journal bearings 358 and drives a shaft 360B through a spline set 362B which permits relative axial translation between the gear 356B and the drive shaft 360B while accomplishing the transmission of rotational energy thereto. The drive shaft 360B is terminated in a conical bearing surface 364B which seats within a complementarily configured journal bearing 366B. The bearing 366B is secured to a back force piston 368B which is disposed for axial sliding translation within a cylinder 370B. The piston 368B is secured to elongate rod 372B having threads 374B and luck nuts 376B disposed thereon which determine the extent of travel of the piston 368B. The cylinder 370B is supplied with compressed air to provide a moderate downward force against the drive shaft 366B during the wrapping operation to ensure a tight uniform wrap as will be more fully described subsequently. Axially aligned with the elongate rod 372B is a sensing terminal 378B which is supported by an insulated housing 380 which may be fabricated of nylon or other suitable insulated material. The sensing terminal 378B may be utilized to provide an electrical indication that the wrap cycle has been completed. Return of the drive shaft 360B to an upper position upon completion of a wrap makes electrical contact between the sensing terminal 378B and the terminus of the elongate rod 372B.

In addition to the piston 368B, a bit loading pneumatic piston and cylinder assembly 386B also controls the (minimum) vertical position of the drive shaft 360. The assembly 386B is of conventional double-acting design and the piston assembly 386B is of conventional double-acting design and generally about midpoint of its length which is engaged by a tab 392B. The tab 392B forms a portion of a collar 394B disposed about the drive shaft 360B. The drive shaft 360B is axially restrained in one direction by cooperation between a lip 396B on the drive shaft 360B and a pin 398B against which the lip 396B rests. Selective supply of compressed air to the piston and cylinder assembly 386B raises or lowers the collar 394B and the drive shaft 360B to effect loading of the wire wrapping tools in accordance with conventional practice. The piston and cylinder assembly 386B thus also provides a minimum vertical position of the drive shaft 360B above which the drive shaft 360B may be axially translated subject to the downward biasing force of the back force piston 368B. The drive shaft 360A and 360B each rotatably engage a respective wrap tool bit 402A and 402B which are splined or pinned within respective tool sleeves 404A and 404B such that relative axial translation associated with, for example, loading of the wrap tool bits 402A and 402B may occur, while ensuring that the sleeves 402A and 402B rotate together. A retaining clip 406 selectively retains or releases the wrap tool sleeves 404A and 404B.

Referring now to FIGS. 18, 20, and 21, the wrap tool sleeves 404A and 404B extend downwardly and are engaged around their circumference by a sleeve clamping assembly 410. The sleeve clamping assembly 410 includes a single conventional double-acting pneumatic piston and cylinder 412 having a piston rod 414 which terminates in a frusto-conical surface 416. A first clamping plate 418 defines an aperture 420 having a complementarily angled frusto-conical sidewall portion 422 through which the wrap tool sleeves 404A and 404B extend. The clamping plate 418 is spring biased by one of a pair of equal spring rate compression springs 424 disposed between an aligned portion of the plate 418 and one of a pair of spring securing drive pins 426 which is fixedly secured to the housing 320. The sleeve clamping assembly 410 further includes a second clamping plate 428 having a complementarily angled rear surface 430 and sleeve engaging surfaces 432. The second clamping plate 428 is slidably mounted and similarly biased by the other of the compression springs 424. Two retaining plates 434 secured by suitable fasteners retain the elements of the assembly 410 in proper relationship. The clamping assembly 410 is illustrated in FIG. 18 in its activated position, that is, compressed air has been supplied to the cylinder and piston 412 driving the frusto-conical surfaces 416, 422, and 430 into engagement. The clamping plate 418 thus moves to the right, the clamping plate 428 moves to the left, and both in turn restrain the sleeves 404A and 404B. Retraction of the piston rod 414 to its upper position, frees the clamping plates 418 and 428 and the sleeves 404A and 404B which then may translate radially over a limited range subject to the spring bias provided by the compression springs 424.

Figure 23:
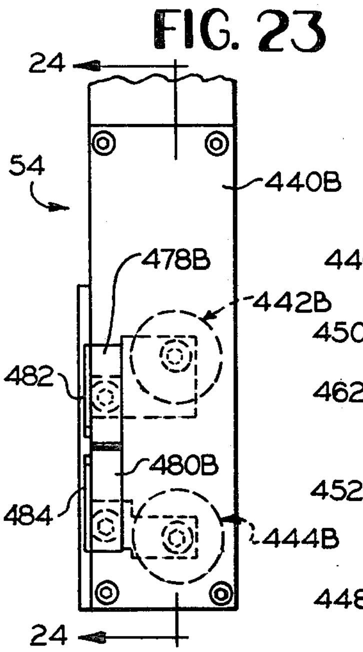
FIG. 23 is a side elevational view of the wire positioning and identification assembly.
Figure 24:
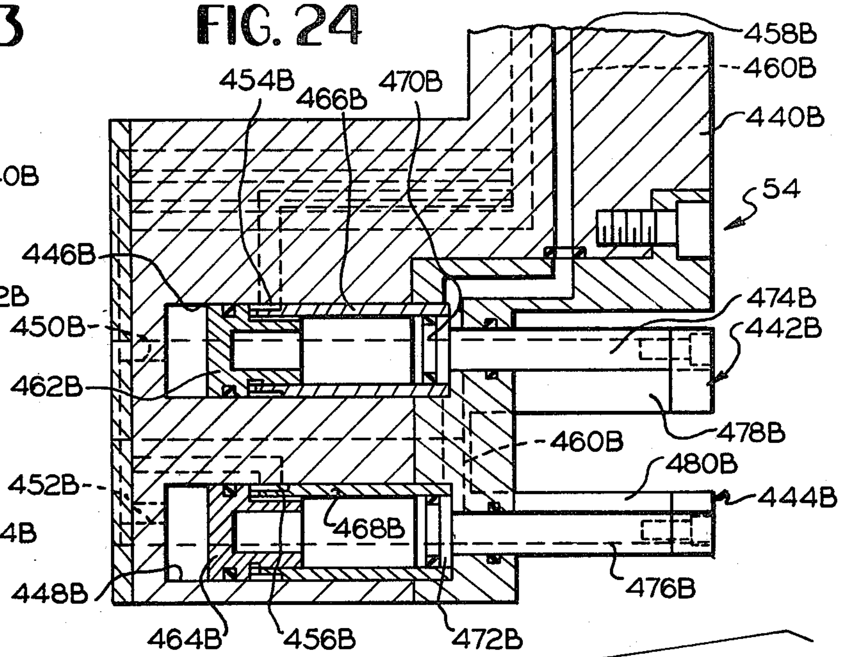
FIG. 24 is a full sectional view of the wire positioning and identification assembly taken along line 24—24 of FIG. 23.
Figure 25:
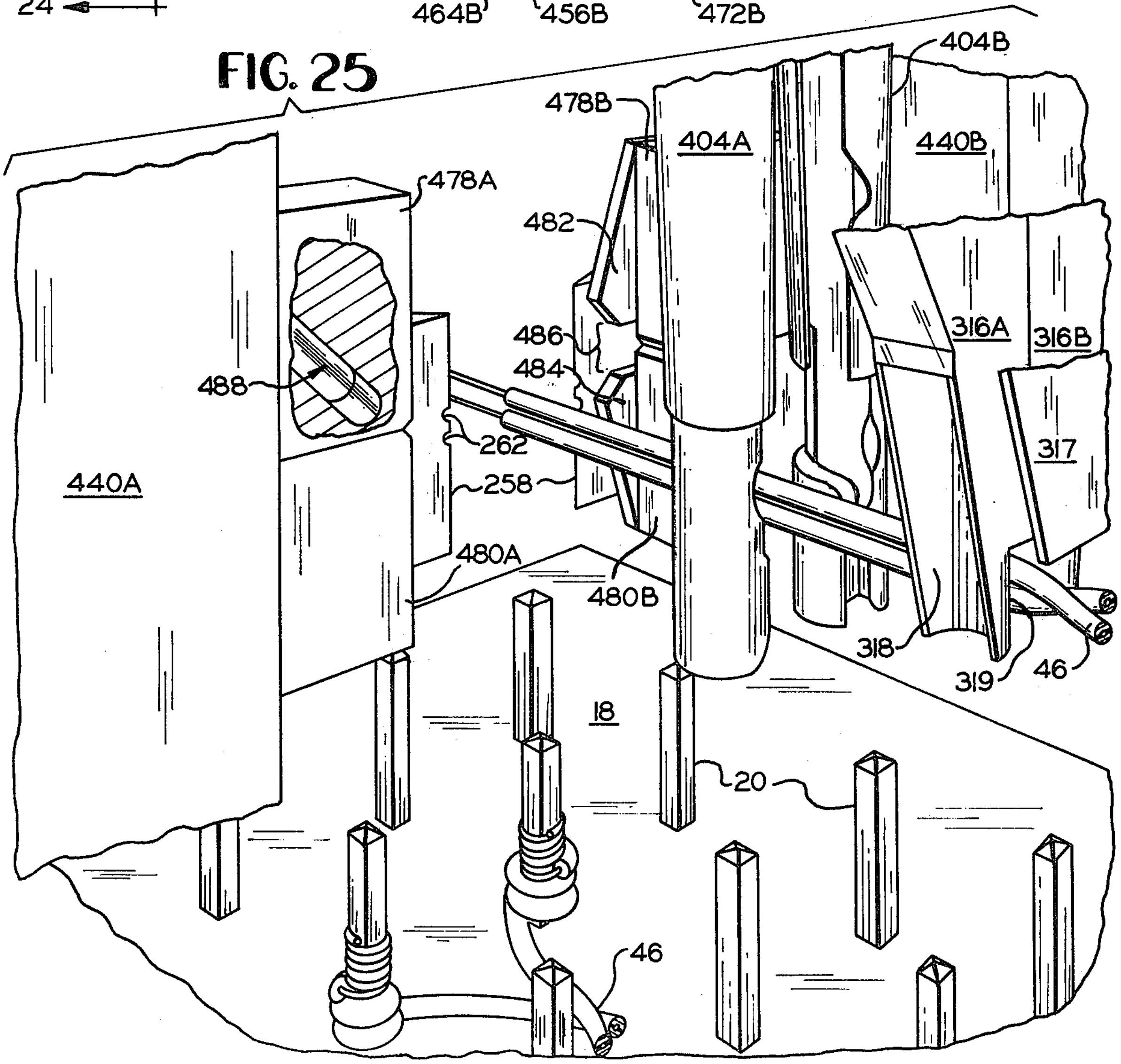
FIG. 25 is an enlarged perspective view of the wrap tool carriage illustrating specifically the wire positioning and identification slides, the wrap tool bits, and the wire gripper jaws.

Referring now to FIGS. 15, 23, and 24, one wire positioning and identification assembly 54 is disposed on the forward portion of each of the tool carriages 32A and 32B, generally intermediate the gripper jaw assembly 50 and the wire stripper assembly 56. The structure and function of each of the wire positioning and identification assemblies 54 is identical and includes a pair of symmetric left and right arm structures 440A and 440B, respectively. The arm structures 440A and 440B function as support means for, as well as define a plurality of passages to left and right pairs of pneumatic cylinder assemblies 442A and 444A and 442B and 444B, respectively. Each of the pairs of cylinder assemblies 442A and 444A and 442B and 444B are substantially identical, a distinction lying only in that like numbered pairs of cylinder assemblies are arranged in opposed, mirror image as illustrated in FIG. 15. Therefore, only the right side arm structure 440B and the associated cylinder assemblies 442B and 444B will be described in detail, it being understood that the opposed cylinder assemblies 442A and 444B, unless otherwise noted, comprise the same structure and provide the same function. The piston assemblies 442B and 444B each include a cylinder 446B and 448B, each of the cylinders 446B and 448B communicating with three passageways, a first air passageway 450B and 452B adjacent a first end of the cylinder 446B and 448B, respectively, a second passageway 454B and 456B disposed generally medially along the length of the respective cylinder 446B and 448B and a third air passageway 458B and 460B disposed at the opposite end of the respective cylinder 446B and 448B. The cylinder assemblies 442B and 444B further each include a poppet piston 462B and 464B which is disposed for limited axial translation within the respective cylinders 446B and 448B, its motion being restrained by an annular sleeve 466B and 468B, respectively. The piston assemblies 442B and 444B further each include a main piston 470B and 472B, respectively, to which an axially extending piston rod 474B and 476B, respectively, is secured. Each of the piston rods 474B and 476B is in turn secured to a respective slide 478B and 480B disposed in parallel spaced-apart relationship to the associated piston rod 474B and 476B for translation therewith. The pair of slides 478B and 480B each includes a symmetric pair of oblique edge wire guides 482 and 484 which are illustrated in FIG. 25. The wire guides 482 and 484 define a vertical interstice 486 which is dimensionally somewhat greater in height than twice the outside diameter of one of the insulated conductors of the twisted pair wire 46.

Referring briefly to FIGS. 15 and 25, the cylinder assemblies 442A and 444A similarly include piston rods 474A and 476A which are secured to and translate a left pair of wire slides 478A and 480A illustrated in FIG. 19. The upper slide 478A includes a bi-directional light pipe 488 which will be described in greater detail subsequently. The light pipe 488 is mounted such that its terminus may be positioned in close juxtaposition with the upper wire of the twisted pair wire as illustrated in FIG. 25.

Referring again to FIGS. 15, 24, and 25, the operation of the cylinder assemblies 442A, 444A, 442B, and 444B of the wire positioning and identification assembly 54 will be described. Inasmuch as the assemblies 442A and 444A are substantially identical, mirror images of the assemblies 442B and 444B, only the operation of the latter two will be described. As noted, the cylinder assemblies 442B and 444B are capable of providing three distinct selectable positions of axial translation of the main pistons 470B and 472B and the slides 478B and 480B. In FIG. 24, the slides 478B and 480B are shown in their fully retracted position which is achieved by providing pressurized air through the middle passageways 454B and 456B and exhausting air out the end passageways 458B and 460B, driving the pistons 470B and 472B to their rightmost limit of travel. The second, center position of the slides 478B and 480B is achieved by providing compressed air through both the end passageways 450B and 452B and the end passageways 458B and 460B driving the main pistons 470B and 472B into abutment with the poppet pistons 462B and 464B which are then in the position illustrated in FIG. 24. The third, fully extended positions of the slides 478B and 480B is achieved by exhausting air out the pairs of end passageways 450B and 452B and the middle passageways 454B and 456B while providing pressurized air through the end passageways 458B and 460B driving the main pistons 470B and 472B to their leftmost positions. Although the operation of the piston assemblies 452B and 444B has been described contemporaneously, it should be understood that they are capable of wholly independent translation between and positioning at the three above described positions. The action of the cylinder assemblies 442A and 444A on the left structure 440A of the wire positioning and identification assembly 54 is identical though in symmetrical mirror image relationship to that just described.

Referring now to FIGS. 22 and 25, the wire positioning and identification assembly 54 also comprehends an electronic circuit 490 which identifies the upper one of the pair of twisted wires 46 positioned within the interstice 486 and provides an output indicative of such wire position which may be utilized by suitable electric or electronic control apparatus to direct and load the wrap tool bits 402A and 402B such that proper wire location and circuit sense is achieved. As noted above, the upper left slide 478A includes a bi-directional light pipe 488. A first group of the optic fibers of the bi-directional light pipe 488 terminate within a housing 492. Within the housing 492 is disposed a light emitting diode 494. A dropping resistor 496 in series with the light emitting diode 494 reduces a typical supply of voltage of five volts to the appropriate level to safely drive the light emitting diode 494. The remaining optic fibers of the bi-direction light pipe 488 terminate within a second housing 500 which photo-Darlington transistor 502. Light impinging upon the base of the photo-Darlington transistor provides a signal which is amplified by a transistor 504. The output of the transistor 504 is then fed to one input of a dual input comparator 506. A scaling resistor 508 is connected between the output of the transistor 504 and a ground bus 510. Connected to the other input of the dual input comparator 506 is a reference voltage which may be adjusted by the variable resistor 512 through a range limited by the fixed resistor 514. An additional resistor 516 provides negative feedback to the input of the dual input comparator 506 and minimizes oscillation and spurious response of the comparator 506. A resistor 518 is also connected between the output of the comparator 506 and the five volt reference supply and functions as a pull up resistor. A scaling resistor 520 is also connected between the second input of the dual input comparator 506 and the ground bus 510. The output of the dual input comparator 506 directly drives an inverting hex buffer 522 which provides an output inverted from the output of the dual input comparator 506.

Proper operation of the electronic circuit 490 is assured by a simple calibration procedure. A first one of the wires of the twisted pair 46 is placed under the sensing end of the light pipe 488 and the input voltage to the dual input comparator 506 from the transistor 504 is observed. This same procedure is then repeated with the other wire of the twisted pair 46. Finally, the variable resistor 512 is adjusted to provide a voltage to the other input of the dual input comparator 506 which is exactly half way between those two previously observed voltages. So adjusted, the output of the electronic circuit 490 will consistently indicate by one signal condition, the presence of one of the wires of the twisted pair 46 of one color in the upper position of the interstice 486 and by a second diverse signal condition the presence of the other color wire of the twisted pair 46 in the upper position in the interstice 486. The output of the electronic circuit 490 is intended to be used by suitable electric controls or electronic processors typically associated with wiring apparatus of this sort to control movement of the slides 478A, 478B, 480A, and 480B of the wire positioning and identification assembly 54 in order that proper signal paths and circuit sense be achieved by the twisted pair wire 46 interconnected between pairs of terminals 20.

Having thus described the various assemblies and elements of the twisted pair wire apparatus 10, attention is directed to FIGS. 25–35, reference to which will be made during the following operational description.

Figure 26:
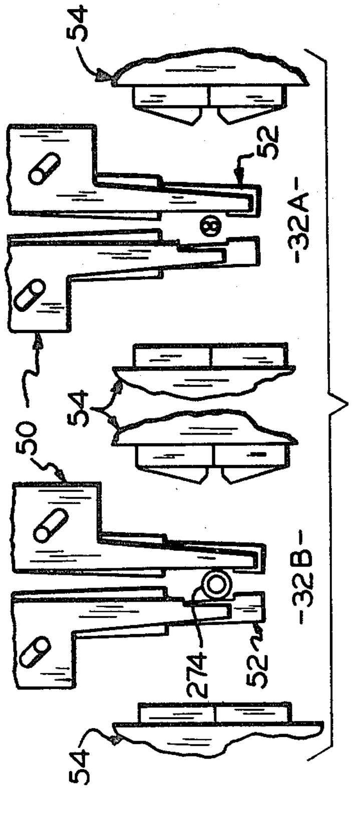

Referring now to FIG. 26, the first or feed tool carriage 32A is illustrated in a fragmentary elevational view and is disposed adjacent a similar view of the second, receiving tool carriage 32B. This view orientation is maintained throughout the remaining FIGS. 27–35, inclusive. FIG. 26 illustrates what has previously been designated the regroup position, that is, the two tool carriages 32A and 32B are in face-to-face opposition prior to the commencement of a wrap cycle. The elements of the wire positioning and identification assembly 54 are all fully retracted, the gripper jaw assemblies 50 are fully opened, the tools of the wrap tool assemblies 36A and 36B are extended and the feed tube 274 of the wire feed assembly 66 is retracted within the tool carriage 32B.

Figure 11:
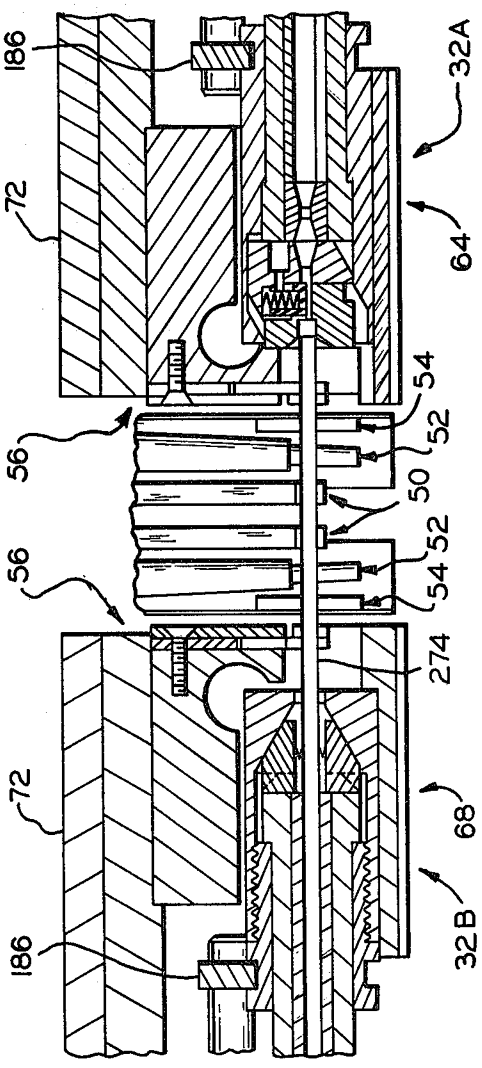
FIG. 11 is a full sectional side view of the wire preparation mechanisms of the first and second tool carriages illustrated in the regroup, i.e., aligned and opposed position, with the wire feed tube extending therebetween.
Figure 27:
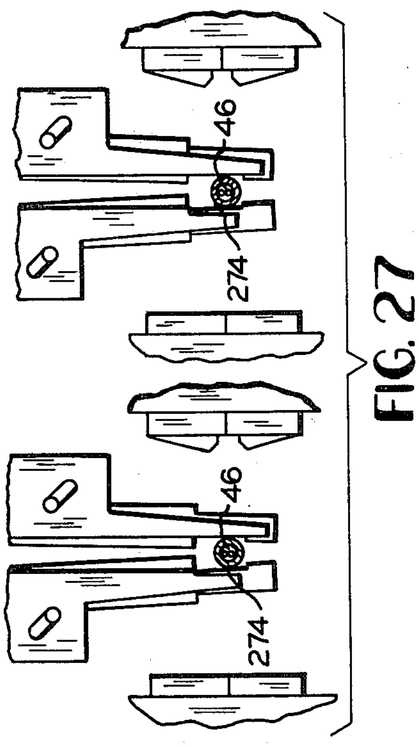
FIGS. 26–35 are diagrammatic representations of the wire gripping, positioning, identifying, and wrapping components of the first and second tool carriages in serial positions during one complete wrap cycle of the apparatus.

Referring now to FIG. 27, as well as FIGS. 7 and 11, the pneumatic cylinder 116 associated with the feed tube assembly 66 is activated and extends the wire feed tube 274 from the position illustrated in FIG. 10, to that illustrated in FIG. 11, i.e., across the gap between the opposed tool carriages 32A and 32B. The limit of extension of the wire feed tube 274 is, of course, controlled by the threaded adjustment screw 126. As is apparent in FIG. 11, the wire feed tube 274 provides a positive routing conduit between the forward portion of the cut and clamp assembly 64 of the tool carriage 32A and the clamp assembly 68 of the tool carriage 32B. Next, compressed air is supplied to the pneumatic piston and cylinder assembly 102, collapsing the passageway 112 and tightly gripping the twisted pair wire 46 passing therethrough. The hydraulic cylinder 116 is then actuated, causing the wire feed and tension assembly 62 to translate toward the opposing tool carriage 32B. Such translation drives a fresh length of twisted pair wire 46 into the wire feed tube 274 and across the gap between the first tool carriage 32A and the second tool carriage 32B. The length of twisted pair wire 46 supplied to the second tool carriage 32B, is adjustable by appropriate setting of the adjustment screw 126 associated with the wire feed and tension assembly 62.

Figure 28:
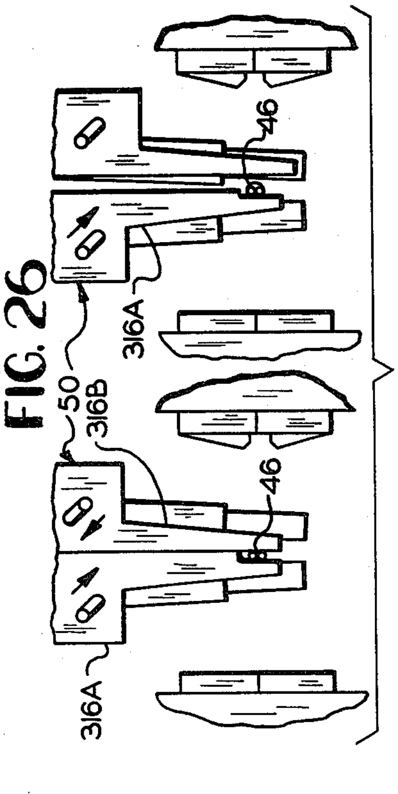

Referring now to FIGS. 7, 10, and 28, the supply of compressed air to the cylinder 116 associated with the wire feed tube assembly 66 is reversed, causing said assembly to translate to the left as viewed in FIG. 10, retracting the wire feed tube 274. Next, the supply of compressed air to the piston and cylinder assembly 102 is terminated and the clamping action of the blocks 108 and 110 terminates. With reference to the second tool carriage 32B, the next activity is the activation of the left and right gripper jaws 316A and 316B. As illustrated, the left gripper jaw 316A translates obliquely downwardly and to the right while the right gripper jaw 316B translates obliquely upwardly and to the left. This action provides a sliding and rolling motion about the axis of the twisted pair wire 46 which positively aligns the two conductors of the twisted pair wire 46 vertically above one another and simultaneously clamps them. Also at this time the clamp assembly 68 of the second tool carriage 32B is activated by appropriate supply of compressed air to the cylinders 180 to drive the draw bar 186 and the housing 200 to the left as illustrated in FIG. 10. It should be apparent that at this time, the twisted pair wire 46 is tightly gripped by two mechanisms of the second tool carriage 32B. Subsequent activity with regard to the first tool carriage 32A includes reverse application of compressed air to the cylinder 116 of the feed and tension assembly 62 to return it to its position most distant the second tool carriage 32B as well as activation of the piston and cylinder assembly 96 by compressed air to provide a controlled drag or tension to the twisted pair wire 46 during the following pattern excursion step. Finally, the left gripper jaw 316A of the first tool carriage 32A is translated obliquely downwardly and to the left.

Referring now to FIG. 1, the pattern excursion or routing the twisted pair wire 46 is achieved. This is accomplished in accordance with conventional wiring machine practice and may include the appropriate utilization and translation of the dressing finger carriages 38A, 38B, 40A, and 40B.

Figure 29:
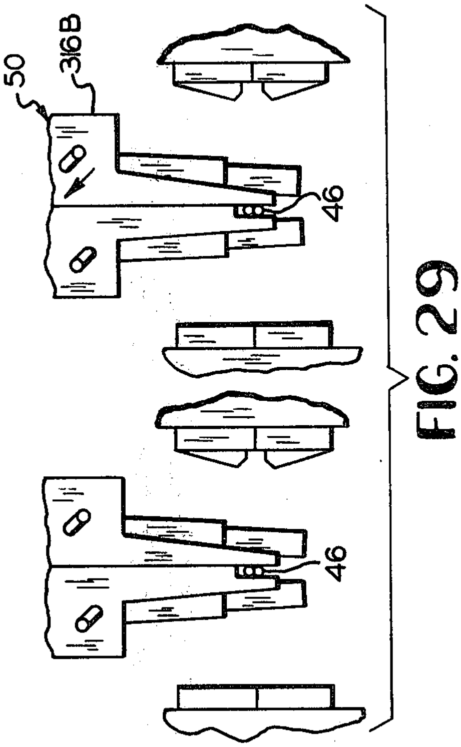

Referring now to FIGS. 29 and 12, the right gripper jaw assembly 316B of the tool carriage 32A is next activated and translated obliquely and upwardly and to the left, again to slide and roll the conductors of the twisted pair wire 46 into positive and tightly gripped vertical alignment. Severance of the twisted pair wire 46 is achieved by appropriate supply of compressed air to the cylinders 180, drawing the draw bar 186 to the right as illustrated in FIG. 6 and severing the twisted pair wire 46, as is illustrated in FIG. 12.

Figure 30:
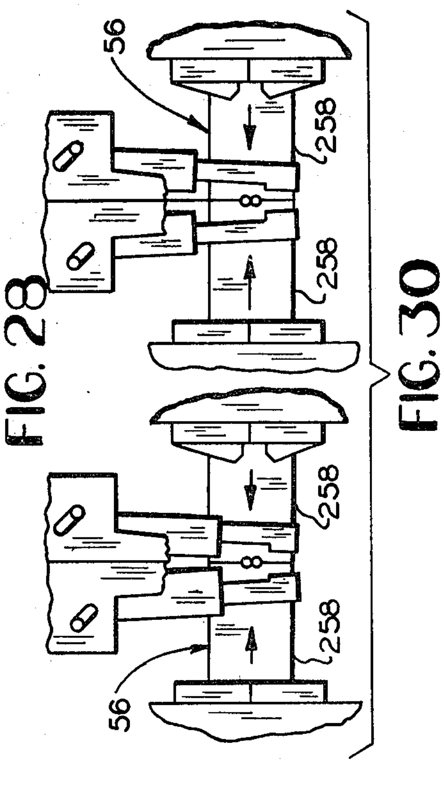

Referring now to FIGS. 14, 29 and 30, compressed air is supplied to the most distant faces of the pistons 138 of the untwist and tension assemblies 58 of both the tool carriages 32A and 32B, providing a tensioning force to the twisted pair wire 46 gripped between the gripper jaws 316A and 316B and the respective cut and clamp assembly 64 of the first tool carriage 32A and the clamp assembly 68 of the second tool carriage 32B. Next, the stepping motors 150 of each of the tool carriages 32A and 32B are activated and rotate the housings 200 and 278 associated with the tool carriages 32A and 32B, respectively, to untwist the conductors of the twisted pair wire 46 such that they extend between the gripper jaw assemblies 50 and the cut and clamp assembly 64 or the clamp assembly 68 in parallel vertically aligned orientation. It should be understood that the stepping motors 150 are intended to be driven by suitable programmable controls such that the necessary rotation may be imparted to the housings 200 and 278 in order to achieve the desired aligned and parallel orientation of the conductors of the twisted pair wire 46. Next, the stripper assemblies 56 are activated and the pairs of stripper blades 258 advance toward one another and score the insulation disposed about the conductors of the twisted pair wire 46.

Referring now to FIGS. 5, 15, 23, 24 and 31, compressed air is next selectively supplied to the cylinders 446A, 446B, 448A, and 448B according to the previously described scheme in order to drive the associated slides 442A, 442B, 444A, and 444B to their center positions. Next, the supply of pressurized air to the cylinders 180 is reversed, translating the draw bars 186 toward one another and releasing tension on the twisted pair wire in both the cut and clamp assembly 64 of the tool carriage 32A and the clamp assembly 68 of the tool carriage 32B. The twisted pair wire 46 is now tightly gripped in both the tool carriages 32A and 32B by the gripper jaw assemblies 50 and is securely positioned within the interstice 486 defined by the guides 482 and 484 on the slides 478B and 480B, respectively. Compressed air is next supplied to the cylinders 266 of the stripper assembly 56 which translates the stripper assemblies 56 as well as the other assemblies mechanically linked thereto away from the wire positioning and identification assemblies 54 and other assemblies disposed on the front portions of the tool carriages 32A and 32B. Translation of the stripper assembly 56 removes the insulation from the conductors of the twisted pair wire 46. Subsequent to the stripping operation, the supply of compressed air to the cylinders 136 of the untwist and tension assembly 58 of each of the tool carriages 32A and 32B may be reversed to return the pistons 138 to the position illustrated in FIG. 5.

Figures 31, 32, 33, 34, 35:
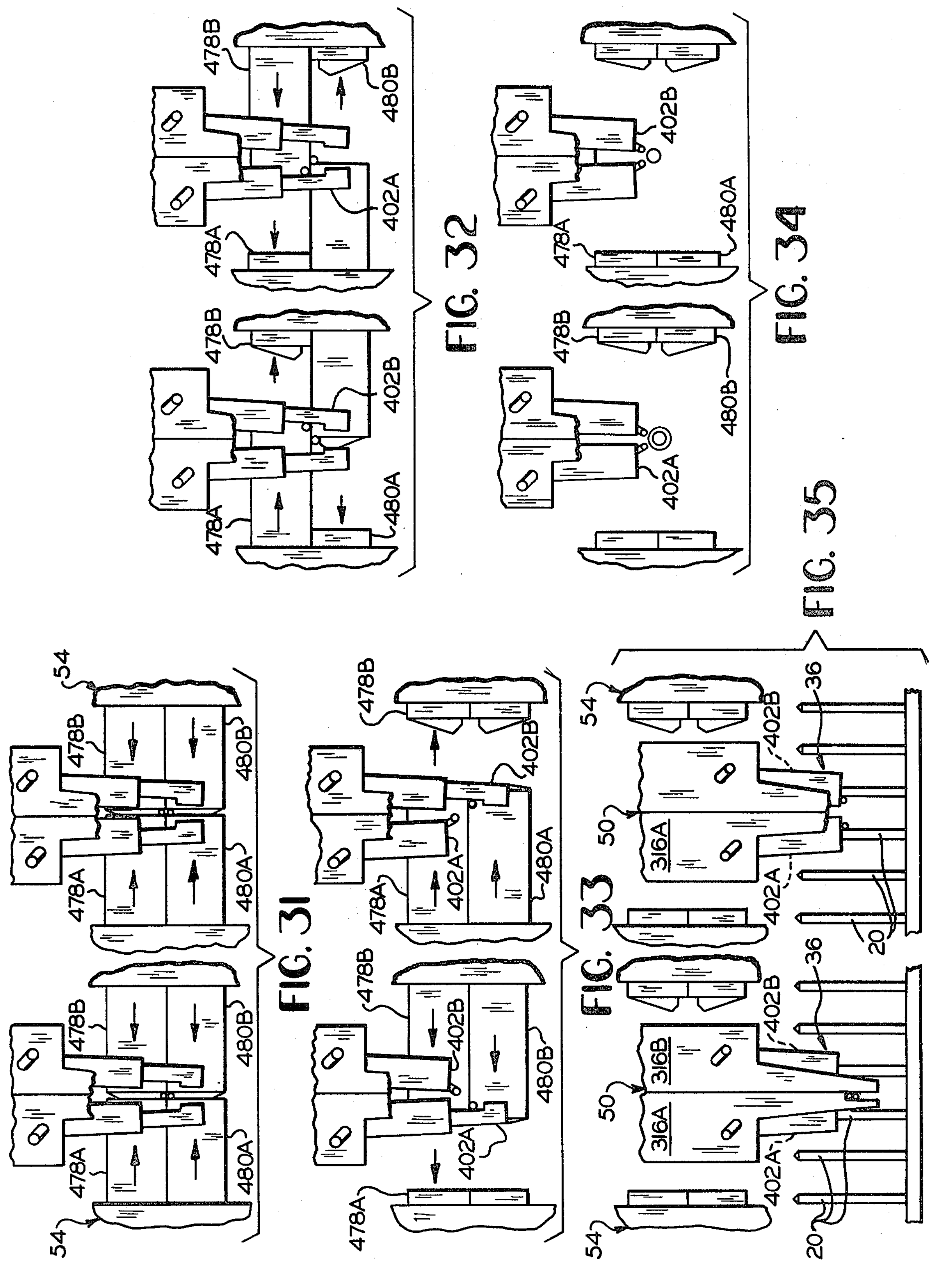

Referring now to FIGS. 22, 24, and 32, the color or relative reflectivity of the upper conductor of the twisted pair wire 46 disposed within the interstice 486 is sensed and the orientation of the wires therein is identified. Based upon this identification, the electric or electronic programmed sequence controller of the twisted pair wire apparatus 10 directs the following sequence of steps to properly direct and connect each of the conductors of the twisted pair wire 46 at each terminal location. For purposes of description, it is to be assumed that the upper wire in the interstice 486 of the first tool carriage 32A is to be connected to the left terminal 20 of a pair of terminals, necessitating its loading into the left wrap tool bit 402A and that the lower conductor in the interstice 486 of the first tool carriage 32A is to be connected to the right terminal 20 of a pair of terminals, necessitating its loading into the right wrap tool bit 402B. Conversely, the upper wire disposed within the interstice 486 of the second tool carriage 32B is to be connected to a right terminal of a pair of terminals 20, necessitating its loading into the right wrap tool 402B of the tool carriage 32B whereas the lower wire disposed within the interstice 486 of the tool carriage 32B is to be connected to the left terminal of a pair of terminals 20, necessitating its loading into the left wrap tool bit 402A of the second tool carriage 32B. The following sequence of bit loading steps will be somewhat more easily understood if it is appreciated that, without exception, the conductor of the twisted pair wire 46 disposed in the upper portion of the interstice 486 is loaded into the wrap tool bits before the conductor in the lower portion of the interstice 486.

With regard to the first tool carriage 32A, the desired wrap tool bit loading is achieved by fully retracting the upper left slide 478 and the lower right slide 480B while extending the upper left slide 478B from its center position to its fully extended position. Similarly, in order to load the wrap tool bit 402B of the second wrap tool carriage 32B with the upper conductor of the twisted pair wire 46, the upper right slide 478B and the lower left slide 480A are fully retracted and the upper left slide 478A is moved from its center to its fully extended position. The upper conductor at each end of the twisted pair wire 46 is now appropriately positioned to load into the proper wrap tool bit.

Referring now to FIGS. 18 and 33, compressed air is supplied to the lower portion of the piston and cylinder assembly 386A of the wrap tool assembly 36A and piston and cylinder assembly 386B of the wrap tool assembly 36B driving the respective pistons 388A and 388B upwardly and carrying with it the respective shafts 360A and 360B, loading the wrap tool bit 402A on the first tool carriage 32A and the wrap tool bit 402B on the second tool carriage 32B according to conventional practice. Next, the remaining conductor of the twisted pair wire 46 must be positioned properly in order to be loaded into the appropriate wrap tool bit. With regard to the first tool carriage 32A, this operation comprehends the full retraction of the upper right slide 478B, the full extension of the upper left slide 478A, and movement of the lower left slide 480A from its center position to its fully extended position. Conversely, on the second tool carriage 32B, the upper left slide 478A is fully retracted, the upper right slide 478B is fully extended, and the lower right slide 480B is moved from its center position to its fully extended position.

Again referring to FIG. 18 as well as FIG. 34, the piston and cylinder assembly 386B associated with the wrap tool 402B of the wrap tool assembly 36A is supplied compressed air to move the wrap tool 402B upwardly into the sleeve 404B to accomplish loading. Likewise, the piston and cylinder assembly 386A associated with the wrap tool bit 402A of the wrap tool assembly 36B is supplied compressed air and drives the wrap tool bit 402A upwardly into the wrap tool sleeve 404A. The wrap tool bits 402A and 402B of both of the tool carriages 32A and 32B are now each loaded with an identified conductor of the twisted pair wire 46.

Referring now to FIGS. 18 and 35, the wrap cycle is achieved by lowering the wrap tool assemblies 36A and 36B with their associated gripper jaw assemblies 50A and 50B such that the wrap tool bits 402A and 402B are properly seated over the appropriate terminals 20. As stated previously, Z-axis translation is accomplished by activation of the Z-axis drive assembly 323. At this time, the sleeve clamping assemblies 410 associated with each of the wrap tool assemblies 36A and 36B are deactivated, freeing the sleeves 404A and 404B for spring-biased radial movement such that minor dimensional variations between the spacings of the terminals 20 may be easily accommodated. Next, compressed air is supplied to the vane motor 324 which drives the wrap tool bits 402A and 402B in opposite directions to perform the wrapping operation. At the completion of the wrap cycle, the supply of compressed air to each of the left cylinders 306 of the gripper jaw assemblies 50A and 50B is released and the compression spring 309 relieves the gripping force of the jaws 316A and 316B without disturbing the twisted pair conductors 46 or necessitating full oblique translation of one of the gripper jaws 316 which would interfere with adjacent ones of the terminals 20.

At this time, the wrap cycle is substantially complete, the remaining steps being necessary to return the various assemblies of the apparatus 10 into position or condition to begin a new wrap cycle. In this regard, the Z-axis drive assembly 323 is activated to return the wrap tool heads 36A and 36B to their initial positions. Secondly, the wrap tool bits 402A and 402B of the wrap tool assemblies 36A and 36B must be properly indexed in order to be loaded on the subsequent cycle. As previously explained, this is achieved by driving the bi-directional vane motor 324 in the reverse direction, appropriate indexing of the wrap tools 402A and 402B being achieved by interference between the pawl 338 and the vertical step 346.

Finally, the gripper jaw assemblies 50A and 50B are returned to the positions illustrated in FIG. 26 by supplying compressed air in the reverse manner to the cylinders 306, driving the left gripper jaws 316A obliquely up and to the left and driving the right gripper jaws 316B obliquely downward and to the right.

Several operational features and considerations of the twisted pair wire wrap apparatus 10 should be noted. First of all, typical prior art wiring machines such as that described in U.S. Pat. No. 3,185,183 noted above include four dressing finger assemblies, two of which are utilized at any given time. Thus, wiring wherein the wire extends generally radially away from a first pin, executes at most two corners defining acute, right, or oblique angles and generally radially approaches a second terminal represent the most complex patterns achievable by such machines. However, in the instant apparatus, gripper jaw assemblies 50, in addition to orienting and gripping the twisted pair wire 46 provided limited dressing finger function. That is, since the gripper jaw assemblies 50 themselves represent points about which the twisted pair wire 46 may be redirected at angles between 0° and 90°, additional wiring capability and increased pattern complexity may be easily achieved. For example, the twisted pair wire 46 always extends away from a pair of terminals 20 along an axis perpendicular to and midway between a reference line drawn between the two terminals 20. From this perpendicular axis, the gripper jaw assemblies 50 may be utilized to redirect the wire at any angle between 0° and 90° from this axis. Additionally, the dressing finger assemblies 42A, 42B, 44A, and 44B may be utilized to redirect the twisted pair wire 46 at acute, right, or oblique angles. Thus, the twisted pair wiring apparatus 10 is capable of interconnecting pairs of terminals 20 on the panel 18 in highly complex patterns in order to achieve various goals such as maintaining minimum wire pair-to-wire pair separation of certain pairs of wires or uniform wiring density.

Second of all, the twisted pair wiring apparatus 10 of the instant invention achieves its innerconnecting function with pretwisted wire which achieves maximum isolation and minimum crosstalk between circuits. The ability to utilize pretwisted wire confers further benefits such as increased machine speed and elimination of the problems attendant the wrapping of individual conductors into a twisted pair by the wiring machine.

Thirdly, it should be appreciated that the insulation or more specifically the surface color of the twisted pair wire 46 must exhibit substantially disparate reflectivities. For example, the use of one black and white wire is recommended to provide the greatest wire identification reliability. It should be remembered, however, that the quantity of light reflected from a wire of a given color is dependent upon the color of the incident light. Therefore, with the appropriate choice of incident light color, insulation or surface colors of the twisted pair wires may be chosen from a broad latitude of complementary colors (one color being the same as the incident light, the other color being the complement of such light) while still achieving the required lead identification accuracy.

Next, the action of the obliquely sliding gripper jaw assemblies 50 should be noted. The motion of the gripper jaws 316A and 316B which is at an acute angle relative to the opposed surfaces which define the wire receiving notch 319 is deemed significant inasmuch as the untwist and tension assemblies 58, the wire stripping assemblies 56 and the wire position and identification assemblies 54 must all operate upon the conductors of the twisted pair wire 46 when they are disposed in parallel, vertically aligned orientation. Such orientation is ensured by the obliquely sliding approach and contact which the left gripper jaw 316A and the right gripper jaw 316B make with one another.

Finally, it should be noted that the twisted pair wiring apparatus 10 of the instant invention may be utilized with wires of various gauges. The instant apparatus is intended for use with 26 gauge wire. It is equally usable with other, especially 28 and 30 gauge wire with minor modifications. Such modifications generally include reducing the size of the wire receiving notch 319 in the left gripper jaw 316A such that it tightly grips but does not damage the smaller gauge twisted pair wires; providing appropriately sized wrap tool bits 402A and 402B; adjusting the size of the notches 262 in the stripper blades 258 and ensuring that the interstice 486 as well as the lateral travel of the slides 478A, 478B, 480A, and 480B are appropriate to accommodate the given wire gauge.

The foregoing disclosure is the best mode devised by the inventors for practicing this invention. It is apparent, however, that methods and apparati incorporating modifications and variations to the instant invention will be obvious to one skilled in the art of wiring machines. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. An apparatus for interconnecting first and second groups of terminals with a twisted set of wires comprising, in combination, first means for supplying such wires and securing one end of each wire of such set of wires to a terminal of such first group of terminals, second means for receiving and securing the other end of each wire of such set of wires to a terminal of such second group of terminals, said first and said second means each including means for biaxially and bi-directionally translating said first and said second means, means for untwisting an end adjacent portion of such twisted set of wires, means for identifying at least all but one of said wires, and means for removing insulation from a length of each of such wires of such set, means for directing such identified wires to said securing means.

2. The apparatus of claim 1 wherein said first means include means for providing drag tension on such set of twisted wires.

3. The apparatus of claim 1 further including guide means for feeding said set of twisted wires between said first and said second means.

4. The apparatus of claim 1 wherein each of said first and second means further includes means for tensioning said end adjacent portion of such twisted set of wires.

5. The apparatus of claim 1 wherein said first means includes means for severing such twisted set of wires.

6. The apparatus of claim 1 further including a dressing finger assembly mounted for translation with each of said first and second means.

7. An apparatus for interconnecting pairs of terminals with a pretwisted pair of insulated wires comprising, in combination, a first and a second tool means for connecting respective ends of said pair of pretwisted wires to said pairs of terminals, means for providing biaxial and bi-directional translation of each of said first and said second tool means, each of said first and said second tool means including means for identifying at least one wire of said pretwisted pair, means responsive to such identifying means for directing each of said wires of said twisted pair generally toward one of said pair of terminals, and means for securing each of said wires to said one of said pair of terminals.

8. The apparatus of claim 7 wherein said first and said second tool means include means for untwisting a length of said pretwisted wires adjacent an end, and means for removing a length of insulation from each wire of said pretwisted wires adjacent an end.

9. The apparatus of claim 8 wherein said first and said second tool means further include means for placing such length of said pretwisted wires to be untwisted in axial tension during such untwisting operation.

10. The apparatus of claim 7 wherein said first and said second tool means further include means for positioning the wires of a said pretwisted pair of wires in a reference orientation.

11. The apparatus of claim 10 wherein said positioning means includes a pair of members each defining a wire engaging surface, said members each disposed for translation along an axis oriented at an angle to said respective wire engaging surface.

12. The apparatus of claim 11 wherein said positioning means includes means for biasing at least one of said members toward an open position.

13. The apparatus of claim 7 wherein said first tool means includes means for severing said pretwisted pair of insulated wires.

14. The apparatus of claim 7 wherein said first tool means includes means for providing drag tension on said pretwisted pair of insulated wires.

15. An apparatus for interconnecting pairs of terminals with a pretwisted pair of insulated wires comprising, in combination, first and second tool carriages disposed for bi-directional, biaxial translation over a panel having plural terminals, a dressing finger assembly associated with each of said tool carriages, each of said tool carriages including a pair of securing means for attaching a respective end of each of such pairs of wires to one of said terminals, gripping means for positioning such pair of pretwisted wires in an aligned reference orientation, means for untwisting a length of such pretwisted wires adjacent an end, means for removing insulation from a length of each of such wires, means for identifying at least one of the wires of such pretwisted pair, and means for directing such identified wires to an appropriate one of said pair of securing means.

16. The apparatus of claim 15, wherein said first tool carriage further includes means for severing such pretwisted pair of wires and means for supplying such pretwisted wire to said second tool carriage and said second tool carriage further includes means for receiving said pretwisted wire supplied by said first tool carriage.

17. A wiring carriage for connecting a pair of pretwisted wires to a pair of terminals comprising, in combination, means for restraining such pair of pretwisted wires against rotation at a finite distance from an end of such pair of wires, means for gripping such pair of pretwisted wires at substantially the end of such pair of pretwisted wires, means for untwisting such pair of pretwisted wires disposed between said restraining means and said gripping means including means for providing adjustable incremental rotation of said gripping means and, means for removing an end adjacent length of insulation from each wire of such pair of pretwisted wires, means for securing each of the wires of such set of pretwisted wires to one of the terminals of such group of terminals in multiple helical wraps, means for identifying at least one wire of such pair of pretwisted wires, and means for directing such wires to said means for securing each of such wires of such pair of pretwisted wires.

18. The wiring carriage of claim 17 wherein said means for directing such wires includes a plurality of guide members moveable between first, second and third positions.

19. The wiring carriage of claim 17 further including means for providing tension to such set of pretwisted wires disposed between said restraining means and said gripping means.

20. The wiring carriage of claim 17 wherein said restraining means includes a first gripping member defining a first gripping surface and a second gripping member defining a second gripping surface.

21. The restraining means of claim 20 wherein said first and said second surfaces are disposed substantially parallel to one another and at least one of said gripping members is disposed for translation along an axis angularly oriented relative to said substantially parallel first and second surfaces.

22. The wiring carriage of claim 17 further including means for providing drag tension to such set of pretwisted wires.

23. The wiring carriage of claim 22 wherein said tensioning means includes a plurality of resilient members disposed for rotation and cooperatively defining a passageway through which such set of pretwisted wires may pass.

24. The wiring carriage of claim 17 further including conduit means guiding such set of pretwisted wires and means for axially translating said conduit means.

25. The wiring carriage of claim 17 further including means for severing such set of pretwisted wires.

26. A wiring carriage for connecting a pair of insulated pretwisted wires to a pair of terminals comprising, in combination, means for restraining such pair of pretwisted wires against rotation at a finite distance from an end of such pair of wires, means for gripping such pair of pretwisted wires at substantially the end of such pair of wires, means for untwisting such pair of wires disposed between said restraining means and said gripping means, means for providing tension to such pair of pretwisted wires disposed between said restraining means and said gripping means, means for removing an end adjacent length on insulation from such pair of pretwisted wires, means for securing each wire of such pair of pretwisted wires to one of such pair of terminals, said securing means including a pair of wrap tools, means for identifying at least one of the wires of such pair of pretwisted wires, and means for directing each of such wires to one of said wrap tools.

27. The wiring carriage of claim 26 wherein said stripping means includes a pair of translating blades disposed between said gripping means and said restraining means.

28. The wiring carriage of claim 26 further including means for severing such pair of pretwisted wires, means for providing drag tension on such pair of pretwisted wires, and feed means for advancing such pair of pretwisted wires within said carriage, said feed means including means for clamping such pair of wires and means for axially translating such pair of pretwisted wires and said clamp means.

29. The wiring carriage of claim 28 wherein said means for severing such pair of pretwisted wires includes a hollow rotatable housing defining an axis and having aligned surfaces disposed at an angle to said axis, a severing member having complementary, aligned surfaces disposed within said housing, a spindle having a bifurcated end portion which receives such severing member and an ene member defining a severing edge whereby axial translation of said housing relative to said spindle radially translates said severing member.

30. The wiring carriage of claim 26 further including wire receiving means for guiding such pair of pretwisted wires into said carriage and means for axially translating said wire receiving means.

31. A wrap tool assembly having multiple wrap tool bits for securing wires to terminals in multiple helical wraps comprising, in combination, two wrap tool bits, each of said wrap tool bits disposed for axial translation within an elongate sleeve, drive means for rotating said wrap tool bits and said sleeve, said wrap tool bits being rotated in opposite directions, index means for orienting said wrap tool bits in a position for receiving such wires, load means for axially translating each of said wrap tool bits relative to said sleeves, and means associated with each of said wrap tool bits for providing an independent biasing force thereto.

32. The wrap tool assembly of claim 31 wherein said biasing means includes a pneumatic piston and cylinder assembly.

33. The wrap tool assembly of claim 31 further including clamp means for selectively radially restraining said elongate sleeves.

34. The wrap tool assembly of claim 33 wherein said clamp means includes a first spring biased member disposed generally adjacent each of said elongate sleeves at first locations and a second spring biased member disposed generally adjacent each of said elongate sleeves at second locations substantially diametrically opposite such first locations and means to drive said first and second members into radial translation inhibiting contact with said elongate sleeves.

35. The wrap tool assembly of claim 31 wherein said index means includes a rotating drive member having a discontinuous helical surface and a spring biased member engaging such surface.

36. A method of interconnecting two groups of terminals with a set of pretwisted insulated wires comprising the steps of providing a substantially continuous set of pretwisted wires having a free end, gripping such set of pretwisted wires at such free end and at a first location disposed a finite distance from such free end, routing such set of wires between a first group of terminals and a second group of terminals, gripping such set of pretwisted wires at a second location disposed a finite distance from such first location, gripping and severing such set of pretwisted wires at a third location disposed a finite distance from such second location, providing tension to such length of wire disposed between such gripped free end and such first location, and such length of wire disposed between such second location and such third location, untwisting such wires disposed between such gripped free end and such first location and such wires disposed between such second location and such third location, removing an end adjacent portion of insulation from each wire of such set of wires, identifying at least all but one of such set of wires adjacent such free end and such severed end, and securing each end of such wires of such set of wires to one terminal of such groups of terminals.

37. The method of claim 36 further including the step of positioning such set of wires in a reference orientation prior to identifying such wires.

38. The method of claim 36 further including the step of directing each end of such wire of such set of wires to a reference position prior to securing such wires to such terminals.

39. A method of interconnecting two pairs of terminals with a pair of pretwisted insulated wires comprising the steps of providing a first and a second wire connecting mechanism, providing such first mechanism with a substantially continuous pair of wires, gripping such pair of wires in such second mechanism, translating said wire connecting mechanisms into proximity with such pairs of terminals, gripping such pair of wires in such first mechanism, severing such pair of wires in such first mechanism, untwisting an end adjacent portion of such pair of wires in such first and second mechanisms, identifying at least one of the wires of such pair of wires in such first and second mechanisms, directing each end of such wires in such first and second mechanisms to a wire securing apparatus, and securing each end of such wires to one of such pair of terminals by wrapping such wires about such terminals in multiple helical wraps.

40. The method of claim 39 wherein such pair of wires defines a free end and further including the step of advancing such free end of such pair of wires from such first mechanism to such second mechanism.

41. The method of claim 39 further including the step of removing an end adjacent portion of the insulation from both wires of such pair of wires in such first and second mechanisms.

42. The method of claim 39 further including the step of providing drag tension to such pair of wires while translating such wire connecting mechanisms into proximity with such pairs of terminals.

43. The method of claim 39 further including the step of placing such end adjacent portion of such pair of wires in axial tension during such untwisting step.

44. The method of claim 39 wherein said step of wrapping such wires about such terminals includes providing independent biasing force directed oppositely to the direction of growth of such multiple helical wraps.

* * * * *